United States Patent [19]

Riskin

[11] Patent Number: 4,757,267
[45] Date of Patent: Jul. 12, 1988

[54] TELEPHONE SYSTEM FOR CONNECTING A CUSTOMER TO A SUPPLIER OF GOODS

[75] Inventor: Bernard N. Riskin, Lambertville, N.J.

[73] Assignee: Applied Telematics, Inc., Wayne, Pa.

[21] Appl. No.: 64,127

[22] Filed: Jun. 17, 1987

[51] Int. Cl.⁴ .............................................. H04M 3/42
[52] U.S. Cl. .................................... 379/113; 379/201; 379/219
[58] Field of Search ................ 379/113, 114, 115, 133, 379/134, 201, 211, 212, 219, 220, 221

[56] References Cited

U.S. PATENT DOCUMENTS

| | | | |
|---|---|---|---|
| 3,556,530 | 1/1971 | Barr et al. | 179/2 |
| 3,614,328 | 10/1971 | McNaughton et al. | 179/18 BE |
| 3,928,724 | 12/1975 | Byram et al. | 179/15 D |
| 4,139,739 | 3/1979 | von Meister et al. | 179/18 B |
| 4,164,025 | 8/1979 | Dubnowski et al. | 364/900 |
| 4,178,476 | 12/1979 | Frost | 179/2 EC |
| 4,310,727 | 1/1982 | Lawser | 179/18 B |
| 4,313,035 | 1/1982 | Jordan et al. | 179/18 BE |
| 4,341,929 | 7/1982 | Alexander et al. | 179/90 B |
| 4,577,062 | 3/1986 | Hilleary et al. | 179/2 A |
| 4,608,460 | 8/1986 | Carter et al. | 179/6.11 |

Primary Examiner—Stafford D. Schreyer
Attorney, Agent, or Firm—Richard C. Woodbridge

[57] ABSTRACT

A telephone system automatically connects a potential customer with a nearby dealer who can provide the goods or services desired by the potential customer. The potential customer first dials an "800"-type number which preferably includes digits uniquely characteristic of the product or service desired. The system identifies the originating telephone number of the potential customer and a computer initially routes the call to a specific customer dealer service company (CDSC) office in the general vicinity of the potential customer. The specially equipped CDSC HQ office includes a vertical-horizontal (V-H) file listing each dealer by product/service and equivalent of longitude/latitude. A comparison is performed between the telephone number of the potential customer and the data in the V-H file to find 1–3 selected dealers nearby to the potential customer. The system then automatically dials the telephone number of the closest dealer thereby routing the potential customer directly to a nearby dealer who can provide the products or services of interest to that customer. If the dealer's telephone number is busy or does not answer, the system can attempt to call another nearby dealer if one exists. The system also provides for billing the telephone call and for reporting each call in detail to the advertiser.

42 Claims, 14 Drawing Sheets

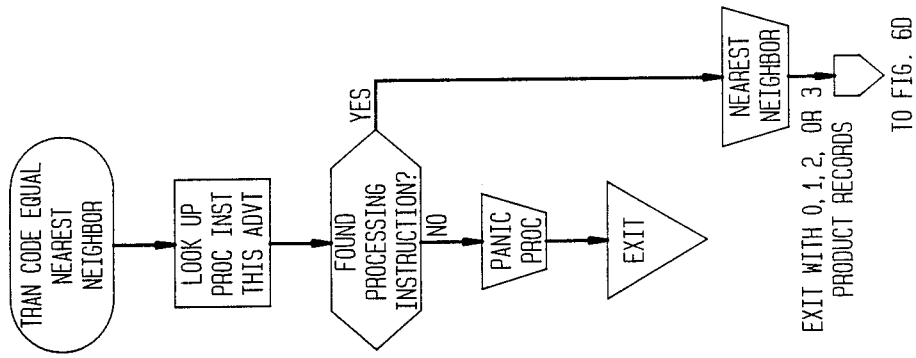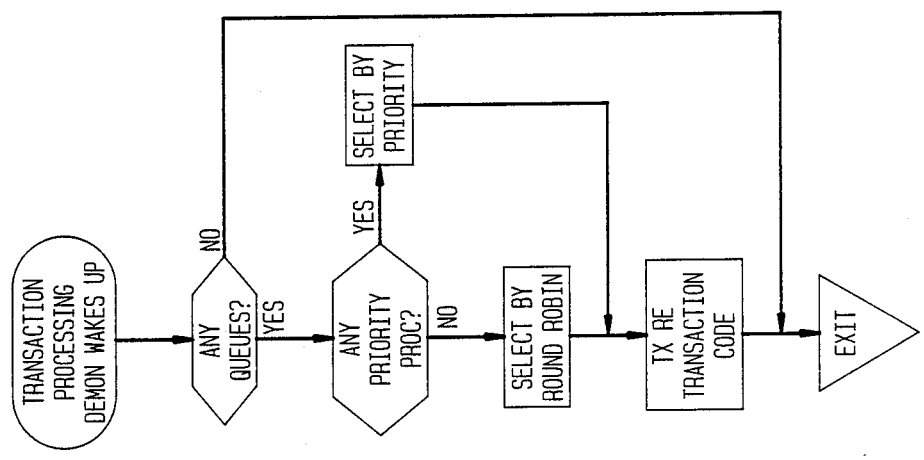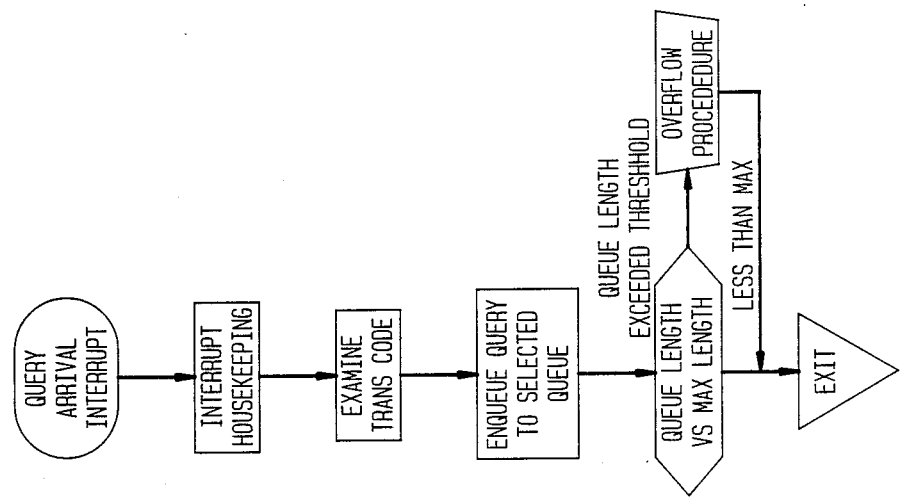

TELEPHONE SYSTEM FOR CONNECTING A CUSTOMER TO A SUPPLIER OF GOODS

BACKGROUND OF THE INVENTION

1. Field of the Invention

The invention relates to a system for automatically connecting a potential customer to a dealer who can provide the goods or services desired by the customer.

2. Description of Related Art

A need is recognized by the prior art for a system that will connect a telephone subscriber to a specific provider of the desired goods or services. For example, U.S. Pat. No. 3,614,328 describes an Automatic Subscriber Answering Service in which the subscriber, after making a telephonic connection with a data center can dial additional digits which cause the subscriber to be provided with information concerning the desired goods or services. An additional feature of that system is the ability of the file selector to only select files within a predetermined range of the subscriber's calling station. However, the foregoing system is relatively inefficient, time consuming and does not appear to have the ability to directly connect a subscriber to the nearest dealer in the desired goods or services based solely upon the telephone number originally dialed by the subscriber.

U.S. Pat. No. 4,577,062 entitled Method for Dispensing Information describes a system in which stock information can be provided concerning a specific stock based upon a sequence of digits dialed by the subscriber. The system also has the ability to invite the caller to dial a pre-arranged sequence thereby forwarding the subscriber to a broker in that stock. The following additional patents may also be relevant to the present invention: U.S. Pat. Nos. 3,556,530; 3,928,728; 4,139,739; 4,164,025; 4,178,476; 4,130,727; 4,313,035; 4,341,929; and 4,608,460.

"Remote Call Forwarding (RCF)" is also a concept that has become fairly well known in the last few years. That technique allows a caller to be directly connected with a desired party even if the desired party changes his or her physical location. The system normally requires that the desired party advise the system so that the new location of the desired party can be stored in a data bank. While RCF is relatively well known, it cannot provide for the forwarding of a telephone call to a dealer in desired goods or services based upon solely upon the telephone digits dialed by the potential customer.

Lastly, there does exist a system for determining the distance between a subscriber and a contacted party. Such a system is described in the New England publication "Background for Management" No. 33, December 1959 in an article entitled "What is This New V-H System?" The purpose of the V-H systems is to determine the airline distance between subscribers and all parties in order to bill the subscriber based upon the geographical distance between the subscriber and the called party. The use of V-H systems for other than billing purposes is believed to be novel.

SUMMARY OF THE INVENTION

Briefly described the object of this invention is to provide an advanced dealer referral service to national and regional advertisers in various media such as magazines, radio, yellow pages, and television.

Advertisers of products with "limited distribution" have a problem in that they must provide the prospective customer responding to an advertisement with the identification of a dealer of the product/service located conveniently to the prospective customer. The major objective of placing the advertisement will be accomplished if the prospect goes to the dealer's location and purchases the advertised product/service. "Limited distribution" refers to products which are not ubiquitously available such as are, e.g., cigarettes at supermarkets, drug stores, gas stations, etc. An example of a limited distribution product is a particular brand of an article of clothing which is carried by perhaps 1000 retailers throughout the country. When the manufacturer of this article of clothing places an advertisement, he must then find some manner of directing respondents to his advertisement to one of his (e.g.) 1000 dealers. Some referral methods commonly in use today are to publish a list of dealers in the advertisement (sometimes "regionalizing" the ad by publishing certain sublists of dealers in certain regional editions of a magazine), taking advertising space in the Yellow Pages of telephone books in every locality where there might be interest in his product/service, or the latest method which is to publish an 800 number inviting respondents to his advertisement to call the number for the name of the nearest dealer. An 800 number refers to a service provided by the long distance communications carriers (LDC) which allows callers to make a long distance call which is paid for by the recipient of the call rather than the caller. 800 service is commonly termed "In-WATS" where WATS is an acronym for "Wide Area Telephone Service. The "In" means that the call is directed from the caller to the owner of the telephone number in contrast to "Out-WATS" where the owner of the telephone places the telephone call.

The 800 calls are usually answered by the advertisers themselves or by telephone service bureaus who maintain dealer lists of the advertised products. When a call arrives at the service bureau, an operator will query the caller as to the product/service of inquiry and as to the caller's location. Determination of the product will define the dealer list to be consulted by the operator. Determination of the caller's location will define the particular subsection of the selected dealer list to be searched.

The lists are maintained in various formats and sequences. Some examples of formats are computer printouts, microfilm, and in the newer services, the lists are maintained in a computer which is accessible to the operator by a console at his or her workstation. The sequence is by state and within state by city, and in some cases by the postal zip code. The operator maintains a three way communication between the caller, herself, and the dealer list attempting to decode the geography such that it is possible to select a dealer nearby to the caller and to deliver this information to him over the telephone.

This invention improves upon all present methods of dealer referral by embodying the following features:

1. The telephone is answered automatically by a computer using digitally recorded voice instead of by a human telephone operator. The computer interacts with the caller to acquire the required information of the product/service of interest and the callers TELEPHONE NUMBER. Given the first six digits (termed the NPA-NNX) of the caller's telephone number, the system can determine the caller's location by reference to a telephone company computerized document called the "V-H" file. V-H stands for "Vertical-Horizontal". It is a file which associates a vertical and horizontal coordinate pair to every Central Office code (COC) in the telephone system. NPA referred to above means "Number Plan Area" and is commonly termed the "Area Code". NNX within NPA is the COC.

The V-H is a complex transformation of latitude and longitude which is used by long distance telephone companies to compute the distance between a caller and a called party and thereby to assess the charge for the call. The invention uses the V-H coordinate system to refer a caller to a dealer.

The acquisition of the caller's data depends upon the caller using a Touchtone telephone and upon the ability of the computer to recognize these tones and interpret them to decode the required input data. If the caller is using a rotary dial telephone rather than a Touchtone telephone, the computer will recognize this fact by the expiration of a timer set when the computer's telephone connection first goes off-hook. The computer will then set up a call to the Headquarters Call Routing Centers (HQRC) where human operators are in attendance. The call is a three-way conference call including the caller, the operator, and the computer. The human operator will perform the function of querying the caller as to product/service and NPA-NNX. As the human operator hears the responses from the caller, she enters them using a Touchtone pad. The computer is on-line and "listening" to the conversation between the caller and the human operator, thus "hears" the DTMF (Dual Tone Multi-Frequency) tones emitted by the operator's keypad. After completion of the data acquisition phase of the three way call, the human operator goes on-hook having completed his or her function of substituting the operator's DTMF keypad for the caller's rotary telephone. At this point, the call proceeds as if the caller had called using a Touchtone telephone. Note that only one RC, i.e. the HQ RC is staffed by human operators. It is calculated that it is more cost effective to pay for the short call from an outlying RC to the headquarters RC than it would be to staff all the RCs with human operators. The human operators at the headquarters RC are employed as data entry operators when not occupied with answering calls generated by outlying RC recognition of callers with rotary rather than DTMF service.

The system also contemplates using speaker independent voice recognition which operates over the telephone network for processing rotary calls. This equipment can recognize a limited vocabulary of spoken disconnected words comprised of at least the digits 0-9, the letter O which is a substitute for the number zero, the words YES and NO and perhaps two or three other words. The voice recognition function is implemented by circuit boards which can be mounted into the telephone management computers in the same manner as the digital voice-Touchtone recognition boards.

2. After the digital voice subsystem interacts with the caller to acquire product/service identification and NPA-NNX, the computer proceeds to search the product/services—dealers database based upon the V-H coordinates. It calculates the distance between several potential dealers and the caller and chooses the closest one to the caller. If there are several dealers approximately equi-distant from the caller, the computer may instruct the digital voice subsystem to interact with the caller to query him as to his choice. The computer may also employ one of several algorithms to determine for itself which one of several approximately equi-distant dealers to refer to the short caller.

3. Having selected a particular one of several nearby dealers, chosen in turn from the total list of hundreds or thousands, the computer will dial up the selected dealer and cross-connect the caller with the dealer rather than merely delivering the dealer identification to the caller. The caller will then be in telephone interaction with the dealer. If the selected dealer does not answer, the computer may call another nearby dealer.

4. The system employs two advanced call routing methods. The first call routing method is provided by the long distance carrier. As 800 telephone calls come in to the telephone company network, it is necessary for the long distance carrier to translate the dialed 800 number into a conventional 10 digit telephone number. This is called translating from WATS (Wide Area Telephone Service) to POTS (Plain Old Telephone Service). This translation is performed by a computer which is stationed at a node in a call set-up network which is separate and distinct from the voice network. The call set-up network processes packet switched call set-up data in order to set up the switched voice call. The data transmitted over the call set-up network and the processing of this data is called "Common Channel Interoffice Signaling". An optional part of this process is provided as a service called "Custom Call Routing" (CCR). The CCR chooses a destination POTS number as a table-lookup function of the caller's NPA. There are some 200 NPA's in the system so that there can be some 200 different POTS numbers chosen by the telephone company call set-up processing as a function of the caller's NPA. The present invention contemplates using CCR so as to minimize the cost of both of the in-WATS call and the outbound call to the selected dealer. There will be several RC to which the CCR will direct the incoming 800 calls. The number and location of the centers is chosen by the CDSC as a function of telephone company tariffs for interstate, inter-LATA (Local Area Transport Arrangement), intra-LATA, and local calls; and of the costs of setting up and maintaining a center.

An RC is a computer connected to the telephone network by several access lines. The access lines may be controlled by telephone company Central Office equipment such as Centrex or by Customer Premises Equipment such as a PBX. The functions of the equipment in either case are to demultiplex calls on multiplexed lines, accomplish call distribution, accomplish cross connection, and accomplish remultiplexing.

A Centrex system allows for Direct Inward Dialing (DID) of telephone numbers in a local telephone company's customer's offfice. Each extension number for a customer is connected to the telephone company by an individual local loop. This is in contrast to a PBX (Private Branch Exchange) wherein the customer company is connected to the telephone company central office by perhaps one fourth as many trunks as there are extensions in the company, thereby economizing the cost of the telephone service. When a PBX is used, the caller usually dials a single telephone number for the entire company and then is switched to a particular party within the company by a receptionist operating the PBX. The PBX also allows the DID.

One of the available features of Centrex or PBX is called "Uniform Call Distribution" (UCD). Arriving calls are distributed to stations which are available (not busy) to receive them. The selection of the particular station is usually accomplished in a rotary process. The process attempts to connect to each successive line in its turn if it is free until it reaches the last line in the system at which time it begins again with the first line. If no station is available, the system can emit a busy signal to the caller.

When a call arrives, the UCD function can begin at the first line in the system or it can resume hunting for a free line beginning with the line chosen for the previously received call. According to the present invention, there is a computer connected to each station to the PBX or to each line of the Centrex. These computers perform the telephone management function. The telephone management computers are all connected to a larger computer which performs the database management (file server) function.

The system of the telephone management computers in concert with the database management computer will solicit and receive the required identification from the caller (product/service and NPA-NNX as represented by the dialed 800 number or the dialed number in concert with an extension number and NPA-NNX), perform the selection of one or several dealers, select and dial up one or more dealers until one answers, and connect the inbound and outbound calls.

The transmission of the selected dealer's telephone number to the PBX or other CPE switching machine or to the Centrex is the second of the two routing functions performed as part of the invention.

The computer voice subsystem interacts with the caller to acquire the two data elements of an extension number specifying a product/service and the caller's NPA-NNX. If the originally dialled 800 number is sufficient to identify uniquely the product/service, then it is not required to acquire an extension number. The system searches its database of dealers for the product/service and computes the distance between the caller and several dealers selected as being approximately the nearest to the caller. If only one is clearly to be preferred, the computer optionally notifies the caller using the digital voice system of the dealer's identification (primarily city and telephone number), then dials the dealer. When the dealer answers the telephone, it optionally notifies the dealer using the digital voice subsystem that it has a prospective customer waiting on the line for the specified product/service.

If there are several dealers approximately equidistant from the caller, the system will choose which ones to call and in what sequence to attempt the calls in the event that the first call or calls are unsuccessful (busy or no answer). The choice may be based on the goal of distributing calls equally within a given area or according to some criteria which can be introduced to the dealer database such as sales for a previous period.

In essence, the invention provides an improvement over present systems for dealer referral. It answers telephone calls automatically by computer, it employs telephone company Custom Call Routing to distribute the calls to Routing Centers in an economical manner, it provides further routing according to the V-H coordinate system based on NPA-NXX, and actually connects the caller to his nearest dealer instead of merely giving the dealer's identification to the caller.

There are two additional routing features which the invention can perform—these are "Gift Routing" and "Territorial Routing".

Gift routing relates to the dealer selection performed by the invention in the case of a gift, e.g., flowers or candy, to be sent to the recipient by the caller. A special 800 number is published such as 1-800-CANDIES. When the computer answers the telephone, it will ask the caller the telephone number of the recipient (in contrast to the telephone number of the caller) of the gift. The system locates a retailer represented in the database and routes the call to him as a function of the NPA-NNX of the recipient. The caller will then be connected by telephone to the retailer nearby to the recipient.

Territorial routing is used for industrial products which are sold by dealers to whom exclusive territories have been assigned by the manufacturer. An example of this category of routing is a distributor of garage doors to whom the states of New York and New Jersey have been assigned as his exclusive territory. Other states have been assigned exclusively to other distributors. Therefore, if a call arrives from New Jersey, it will be routed to the New Jersey distributor even though the caller may be geographically nearer to a Pennsylvania distributor.

The invention performs the routing by reference to a territorial database containing a file for each product. A territorial file is constructed by entering the geographical area assigned to each distributor/dealer in the geographical area encompassed by the system. After completing the assignment of the totality of the geographical area to the totality of the distributors, the system checks its internal map to ensure that no territory has been left unassigned, (unless it was omitted because the manufacturer has no representation there) and that no territory has been assigned to more than one distributor.

The data entry staff enters the territories into the computer in formats as supplied by the manufacturer using the system. The database function then converts the territories to its own format and validates the territorial map as above. Users can enter state names and the state names will be converted to NPA-NNXs. For example, when the data entry clerk enters the state "NJ" for a given distributor, this distributor will be assigned the NPA-NNX's of 201-PPP and 609-PPP which are the New Jersey NPA'S. The PPP's are pseudo NNX's which will be taken by the system to mean "any NNX" when performing the telephone referral. It is possible to enter state abbreviations and automatically produce NPA-NNX's because the boundaries of states and NPA-NNX's are co-linear.

The manufacturer can achieve a finer granularity of assignment than state by using the NPA's directly. He can achieve an even finer granularity by using the NPA-NNX's directly. In any event, the territorial file is composed of a series of NPA-NNX's each associated with a particular distributor's telephone number. Some of the NNX's may mean "any NNX". The file sequence is NPA-NNX. The system enters the file with the caller's NPA-NNX as the argument and retrieves the distributor's telephone number as the function.

The territorial assignment may also be entered according to zip codes. The input may be state abbreviation as above but in the case of zip code entry, the system will generate and store all the three digit zip codes for the entered state. Finer granularity can be achieved by directly entering three digit zip codes or five digit zip codes. At the completion of data entry, the system will check as above for duplicate and missing assignments. If the files are zip based, then the telephone management sub-system will solicit and acquire the caller's zip code instead of his NPA-NNX.

If the manufacturer has allocated his territories according to counties or according to any plan other than state, telephone number, or zip code, then the system will not accomodate him because county boundaries, for example, are not co-linear with telephone numbers or with zip codes.

The invention can be further understood by reference to the following drawing and description of the preferred embodiment.

BRIEF DESCRIPTION OF THE DRAWINGS

FIGS. 6A–6I comprise a flow chart of the Call Processing procedure which is executed in the File Server.

DETAILED DESCRIPTION OF THE PREFERRED EMBODIMENT

During the course of this description the same numbers are used to identify the same elements in the different figures that illustrate the invention. Also a Glossary of Abbreviations used in the disclosure is found after the end of this description.

Figure 1:
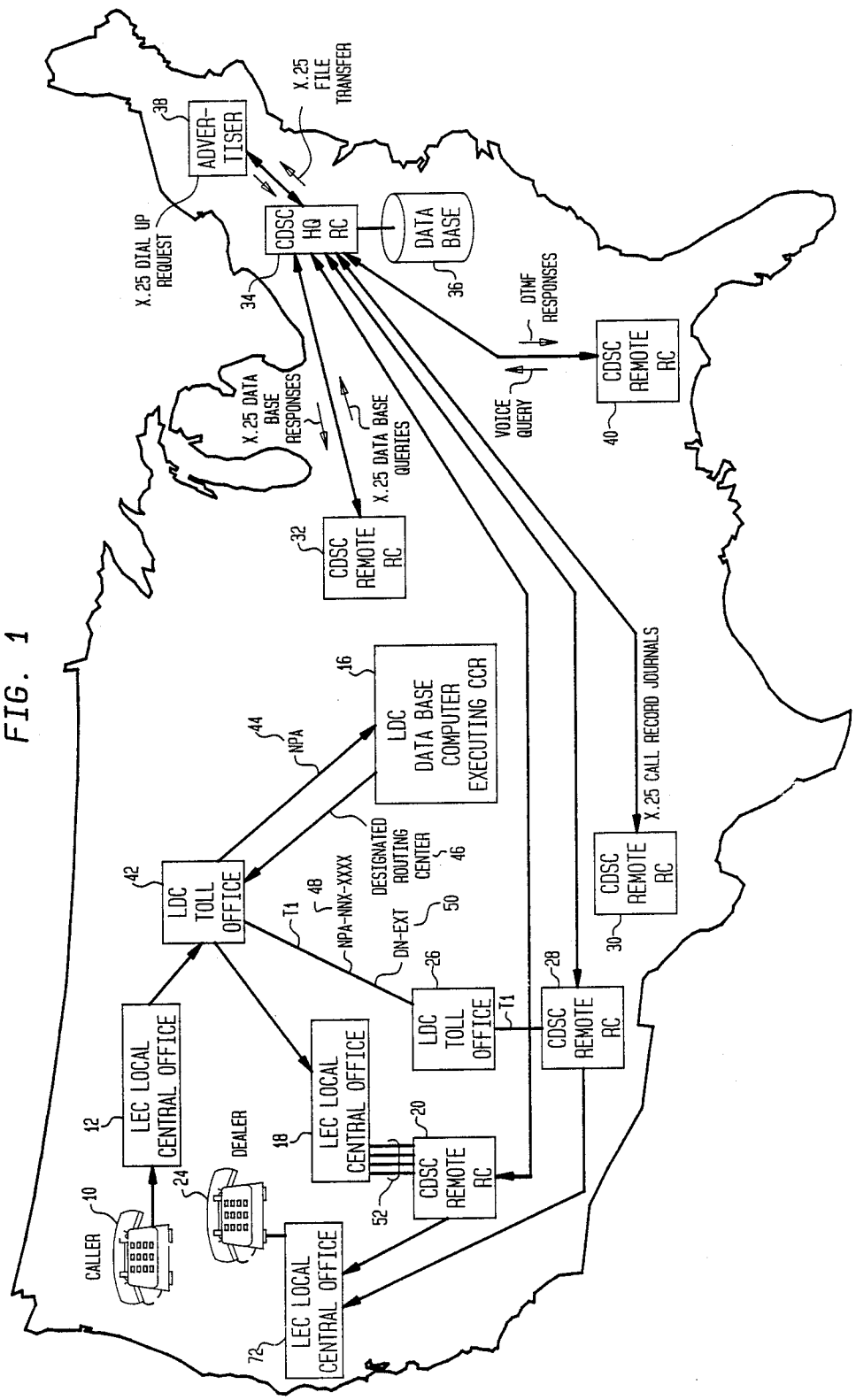
FIG. 1 illustrates the preferred embodiment of the present invention.

Referring to FIG. 1, a caller at 10 places a telephone call to an 800 Inward WATS (Wide Area Telephone Service) number in response to an advertisement. The call is recognized at the caller's LEC 12 as being an 800 call and so requiring special processing.

The call is routed to an LDC database computer 16 via an LDC toll office 42. The LDC database computer performs the function of translating the WATS number into a POTS (Plain Old Telephone Service) number (see U.S. Pat. No. 4,191,860, Mar. 4, 1980, Data Base Communication Call Processing Method, Inventor: Roy Weber) and also performs the function optionally of Custom Call Routing (CCR). In the diagram, the boxes labeled 20, 28, 30, 32, 34 and 40 are six private customer/dealer service companies (CDSC) Routing Centers (RC). The CCR function at 16 examines the Number Plan Area (NPA 44—the first three digits of a ten digit telephone number 48) of the caller's telephone number and routes the call to a designated one of the six CDSC RCS.

If the CCR function has not been contracted for a particular 800 telephone number, all of the calls to this number will be received by the CDSC HQ RC 34. The CCR function operates so as to answer incoming 800 calls as close to their origin as is economically feasible and likewise to place outgoing calls to dealers. The combination of the CCR function and the multiplicity of CDSC RCs is intended to minimize the total cost of incoming calls, outgoing calls, and of RCs.

The number of routing centers and the rationale for their location is described later. There are two types of RCs, a CDSC Headquarters RC 34 and Remote CDSC RCs 20, 28, 30, 32 and 40.

In FIG. 1 the LDC data base computer sends the telephone number 46 of the CCR designated CDSC back to the LDC toll office 42. The call is routed from the toll office 42 to the LEC CO 18 which serves the private CDSC Remote RC 20. The CDSC Remote RC 20 acquires two data items from the telephone network by one of several means to be described later. The two data items are the caller's telephone number 48 consisting of either 10 digits (NPA-NNX-XXXX) or six digits (NPA-NNX) and the 800 number originally dialed by the caller 10. In FIG. 1 the originally dialed number is labeled "DN". Following the DN is the designation "EXT" which refers to an optional extension to the dialed number.

The DN and its associated EXT 50 are processed by the system as follows. The system searches a table which when entered with DN-EXT as the argument yields Advertiser, Product, and Advertisement as the function. Given the Advertiser and Product, (e.g., ACME CORPORATION, ELECTRIC Toothbrushes) the system selects a file to be searched consisting of dealers of e.g., Acme Electric Toothbrushes. This file is part of the CDSC data base consisting of many advertisers, products, and advertisements (see Database Description below and FIGS. 3 and 4A and 4B). Each record in the selected dealer file contains geographic coordinates which were previously inserted when the database was created or updated. The geographic coordinates are based on the V-H (Vertical-Horizontal) system recorded on computer readable media by the Bell Communications Research Company (Bellcore). The V-H system and its application to this system are described in detail later. The V-H file from Bellcore provides a coordinate pair for every telephone company Central Office (CO). The COs are designated by their NPA-NNX so that given NPA-NNX as the argument the V-H file will yield a V-H coordinate pair as the function.

The caller's NPA-NNX is searched in the V-H file and the search yields the caller's V-H coordinate. Then, using a "Nearest Neighbor" algorithm to be described later, the system chooses a dealer nearby or nearest to the caller. The system retrieves the dealer's telephone number and places a call to him. When the system senses that the dealer has answered the call, the originally placed call from 10 is bridged to the call to the dealer at 24. The caller has now been automatically connected to the nearest or nearby dealer of the advertised product which was the subject of the call from 10.

The system listens to the telephone management signals from the network to determine if the dealer call returns a busy, no answer, or answer. If the call is busy or does not answer, the system places another call to a different dealer if one exists reasonably nearby to the caller. This is why reference is made to "nearest" and to "nearby"—in case the nearest is busy or does not answer, another dealer who is nearby will be called.

The system senses when the call is completed. A record called a "Call Record Journal" (CRJ) is created and stored in the data base. The CRJ is used to generate bills and is available to the advertisers who use them for advertising effectiveness analysis. The diagram shows CRJs being sent from a CDSC RC at 30 to the Company Headquarters RC at 34 where they are stored in the data base 36. The method of transmission of CRJs is shown as via an X.25 Packet Transport Network although it is possible to use other means of transmission such as mailing a diskette. The CRJs are collected at 34 where they are used for billing. The advertisers such as one at 38 can call for their CRJs periodically. The transfer of CRJs from the Company HQ at 34 is shown as an X.25 data call but this also may be accomplished by other means such as mailing diskettes. If the file transfer of CRJs is accomplished by a computer to computer data call, the Company HQ will observe password procedures to ensure that each advertiser will only receive his own CRJs.

Method of Acquiring Caller's Number and Dialed Number

There are several methods possible for acquiring the two data items needed to perform the automatic routing function. The first of these two items is the caller's telephone number, either the complete 10 digit number or, optionally the first six digits termed the NPA-NNX. The second of the data items is the originally dialed 800 number, optionally including an extension number.

The most effective method of acquiring these two data items is described with respect to the alternative embodiment at the end of this disclosure. That embodiment is not available to be implemented as the LDC company presently declines to allow connection of foreign computers to its routing and data base computer.

The second most effective method uses features provided by a combination of LDC 800 call processing services and by the new technology of Integrated Services Digital Network (ISDN). Using ISDN, the local CO which originates the call will pass along the caller's 10 digit telephone into the network. This 10 digit number will be available for distribution to interested parties such as the CDSC. This feature is frequently referred to as Automatic Number Identification (ANI).

A feature of 800 call processing called "Dialed Number Identification Service" (DNIS) will pass along to the CDSC computer the identification of the originally dialed 800 number as received at the LDC data base center. Thus, both data items are captured without interacting with the caller. This is true irrespective of whether the caller is using a Touch tone or a rotary telephone.

In order to receive the ANI automatically, several technologies must all be in place and interacting properly. The LDC does not plan to offer the ANI feature until equal access has been substantially completed at the COs of the LECs which comprised the original Bell system. To interface with the ISDN technology exhibited by the telephone network, the CDSC must connect to the network with a T1 line. A T1 line is a Time Division Multiplexed (TDM) line composed of 24 Full Duplex (FDX) channels. As employed with ISDN, these 24 channels are comprised of 23 voice channels operating at 64 Kbs and a data channel which is used to transmit signalling data which controls the operation of the other 23 channels. Using various methods of compression, the 23 voice channels can be used as upwards of 40 channels.

The arrangement of 23 voice channels and one data channel onto a single line is referred to as "23B+D". In order to be usable by the Touchtone ® receivers on the CDSC telephone management interface boards, the 24 (or more) channels must be demultiplexed into separate bit streams and the voice channels must be converted to analog. When a call is received, the data channel will carry a message containing (at least) the ANI and the designation of the channel carrying the corresponding voice call. The appearance of signalling data in a different channel than the voice signal is called "out-of-hand" signalling in contrast to "in-band" signalling wherein the signalling data is contained in the same channel as the voice. Using in-band signalling, some special arrangement is necessary so that the terminating equipment can sort out the signalling data (in this case, the caller's number) from the voice data. Prior to the deployment of ISDN, the T1 line will carry 24 voice channels rather than the 23B+D.

Several methods are available for demultiplexing the channels of the T1 line. Referring to FIG. 1, the LEC local CO is shown as performing the demultiplexing function so that the lines 52 are separated when they arrive at the Company Remote RC at 20. The demultiplexing by the CO implies that the CO will provide Centrex service which will demultiplex and will convert the demultiplexed signals from digital to analog except for the D channel which carries the signalling data (including the ANI).

A CDSC remote routing center such as at 28 may be connected by a T1 line to a switching machine in an LDC toll office such as at 26. In this example, demultiplexing the T1 signals and converting them to analog is the responsibility of the CDCS office. This requires that the CDCS provide a switch with this capability. Such a switch could be a PBX such as an AT&T System 75 or 85. FIG. 1 shows the transmission of the caller's NPA-NNX-XXXX 48 and the DN 50 from an LDC toll office 42 to the LDC toll office 26.

Another means of demultiplexing is to use a machine such as that designated as a "DACS" (Digital Access and Cross-connect System) by the telephone industry. In addition to a DACS, a "Channel Bank" would be required. This machine converts several digital channels to their analog formats. The process of converting digital to analog must be concerned with allowing the D channel to remain in digital format while converting the other channels to analog. Outgoing calls can be sent into the network in digital format. Once an incoming call has been associated with the two data items of caller's number and called (800) number, it can be employed in its digital format and cross connected to an outgoing digital call to the selected dealer.

The function of cross-connecting incoming calls (from respondents to advertisements) to outgoing calls (to dealers) must also be considered. This function can be executed by a Centrex machine receiving its directions from a CDSC computer. It can also be executed by a PBX or by a DACS. Once the cross-connection has been made, the CDSC computer equipment is free to process other calls until the cross-connected call is completed and the parties hang up. At this time, the CDSC switching machine must record the call completion time for billing and reporting purposes and pass it to the computer. It must also recognize that two lines have been freed up and are available to process further calls.

The system depends on the caller using a Touchtone ® telephone (DTMF) in the event that one or two of the two data items required to switch the call are not received automatically. The computer equipment recognizes which one or both of the two items is missing and queries the caller using digital voice to enter one or both items. The two data items are entered by the caller 10 using his Touchtone ® telephone and are recognized by the CDCS computer equipment and converted to digital format for further processing as previously described. The computer equipment which recognizes the Touchtone ® input and converts it to a format suitable for computer processing is, for example, a Natural Micro Systems of Natick, MA circuit board known as a "Watson" board. The Watson TM board also provides the ability to speak digitized voice in requesting the entry of data items. If the caller is using a rotary telephone, it is necessary to switch the incoming call to a CDSC operator who will ask the caller for his number and for the called number if necessary. The human operator is equipped with a Touchtone ® pad and enters the data received from the caller. The CDSC equipment, and in particular, a Watson TM board, is "listening" as the human operator enters Touchtone ® digits. At the completion of data entry by the human operator using his or her Touchtone ® pad, the system has acquired the data and is in the same state that it would have been in if the caller had made the call on a Touchtone ® instead of a rotary telephone.

The data items of caller's telephone number, dialed number and extension number may possibly be acquired by speaker independent voice recognition equipment. This equipment which is implemented in the form of circuit cards which can be mounted in the CDSC telephone management computers is capable of recognizing a limited (about 16) number of disconnected words spoken by any speaker. It is not necessary to prepare (i.e. train) the equipment to any particular person or persons.

DESCRIPTION OF COMPANY ROUTING CENTERS

There are two types of CDSC RCs. The first is termed the Headquarters (HQ) RC and the remaining RC are termed remote RCs. The HQ RC is shown as element 34 on FIG. 1 and the remote RCs are shown as 20, 28, 30, 32 and 40. In addition to the complement of computer equipment, the HQ RC is staffed with human personnel who process the rotary (non Touchtone ®) calls as described in the previous paragraph and who perform other functions such as database update.

The HQ RC 34 has a large disk drive on which it maintains the Company database 36. The database has two major divisions. The first is the data which enables the response to callers seeking to be connected by telephone to their nearest dealers. The second is the CRJ which are generated and collected after every call. The CRJ provide input to the billing function and provide input to the advertising effectiveness studies performed by the advertisers who are the company customers.

The remote RCs do not maintain databases and do not have human staffs. They are intended to be unattended sites and so have the minimum of hardware and do not have people to be supervised. When a remote RC needs to service a call, it sends a data base query via an X.25 Packet Transport Network to the HQ RC such as is illustrated by the remote RC at 32. When a remote RC needs human assistance in acquiring data from a caller with a rotary telephone, it places a voice call to the HQ RC as is illustrated by the remote RC at 40. After completing a caller-to-dealer conversation, the CRJ for this conversation is sent to the HQ RC 34 for archiving via an X.25 Packet Transport Network as is illustrated by the remote RC at location 30.

ROUTING CENTER CONFIGURATION

Figure 2:
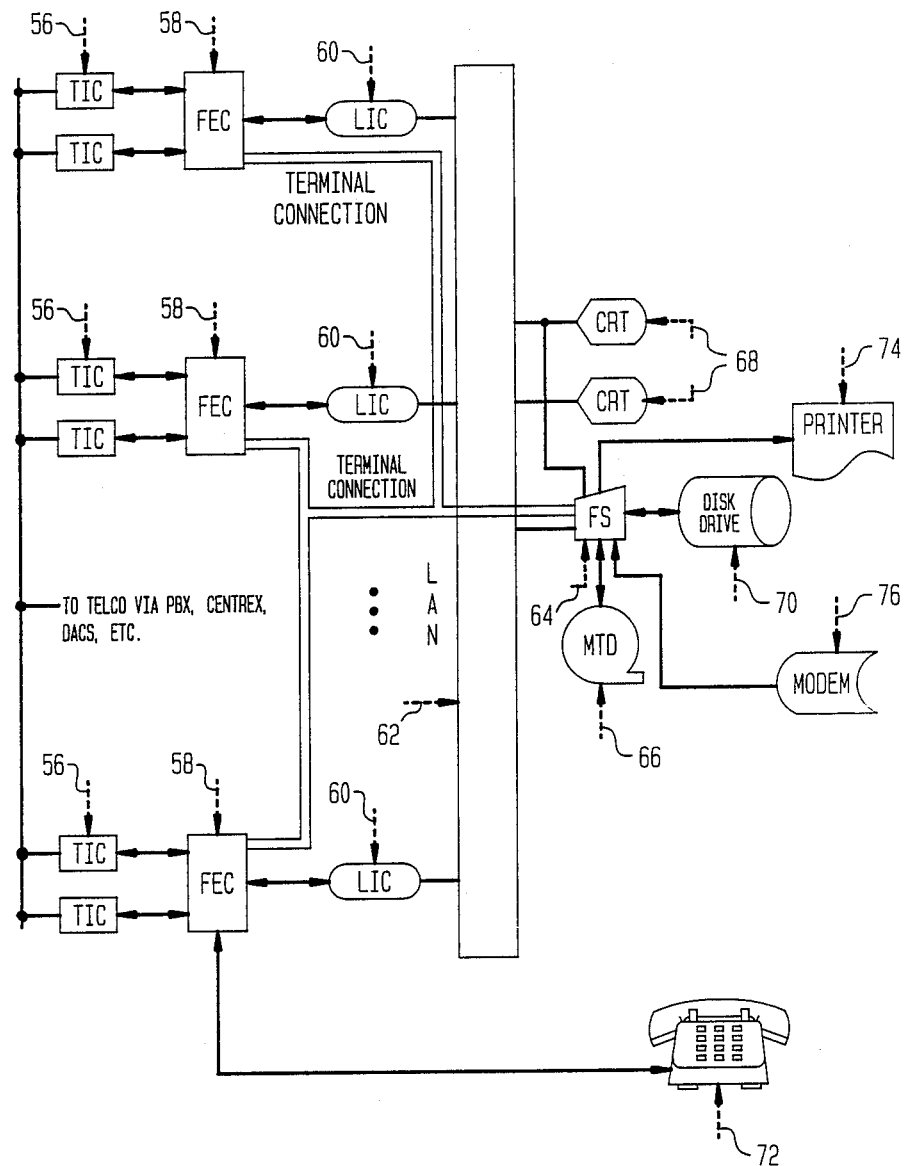
FIG. 2 is an example of a Customer/Dealer Service Company (CDSC) Routing Center configuration.

Referring to FIG. 2, several small Front End Computers (FEC) 58 each with one or more Telephone Interface Cards (TIC) 56 interface to the telephone network either via a PBX of via Centrex.

Each FEC is interfaced to a Local Area Network (LAN) 67 by a LAN Interface Card 60. The Telephone Interface Cards and the LAN Interface Cards are mounted internally in the FEC's.

The LAN is also interfaced to a large computer which performs the File Server (FS) function. The FECs may also be connected as terminals to the file server 64.

The FS computer is equipped with multiple CRT terminals 68 for database update. The terminals are connected to the FS either via the LAN or directly via terminal ports.

The FS computer is also equipped with a magnetic tape drive 66, one or more disk drives 70 on which the database is written, and a modem 76.

There is a printer 74 which is used for program development, correspondence, and miscellaneous uses.

The FEC receive Touchtone ® signals from callers via the telephone network. The Touchtone ® signals are collected by the FEC and when the FEC senses that the transaction represented by the input Touchtone ® string is complete, it relays it to the file server via the LAN or the FS communications port. A transaction is composed of the advertiser/product/advertisement code (dialed number and optional extension) and the caller's telephone number.

The Touchtone ® signals are recognized by the TIC 56 and converted to ASCII data usable by the computer. The TIC 56 also provide audible speech outputted to the telco network. The speech is used to request input and to deliver output.

After receiving the transaction data from the FEC 58, the FS searches its database and retrieves records representing dealers of the specified product which are convenient to the caller. One or more of these records is passed back to the FEC from which the transaction arrived. The FEC extracts the telephone number from the dealer record selected as most convenient to the caller and dials up the through dealer the PBX or Centrex. Optionally, a greeting and/or dealer name is delivered by the speech function to the caller.

There are two computer and auxiliary equipment configurations. The first is the Headquarters computer (HQ e.g. 34), the second is a remote Routing Center computer (RC) (e.g. 20, 28, 30. 32 and 40). There is one HQ and several (perhaps ten) RC. The HQ performs routing in the same manner as an RC and also functions as the database update machine. It is also equipped with voice telephone connections 72 to provide for callers who are not equipped with Touchtone ® telephones. The HQ 34 is equipped with CRT terminals to perform database updates and with a magnetic tape system to back up the database. The RC are unmanned and do not have telephones, CRT terminals, or magnetic tape equipment. The HQ 34 is manned with personnel who perform database updates and answer telephones. The telephone calls are placed when the system senses that the caller does not have a Touchtone telephone. The human operators converse with the callers and enter the required Touchtone input representing product and caller's telephone number.

The modem 76 is used to transmit Call Record Journals (CRJ) from remote RC to the HQ central computer 13 and 14, which functions as the "Data Warehouse" and as the billing machine. This machine provides a central repository for CRJ from all the RC. The CRJ data is available to the advertisers for downloading to their PC's. The modem is also used to receive database queries from all the RC and to transmit responses to the RC.

The FEC are PC's such as are manufactured by IBM, Leading Edge, Digital Equipment, Sperry (IT), BIOS AT, Wells American, Victor Technologies, Tandon, Wyse, Multitech Electronics, Beltron, and PC's Limited. They are equipped with large RAM (640K), TIC, and LAN cards but do not need CRTs, keyboards, or disk drives.

The TIC are manufactured by Natural Micro Systems of Natick, MA. They are known as "Watson Boards". Cards that perform similar functions are also available from Votan.

LANs are manufactured by Novell, 3COM, Gateway Systems, and Western Digital.

There is a bundled file server/LAN and LAN software product available from Cordata Technologies Inc. It incorporates Gateway Communications Inc. network-interface boards. Digital Equipment Corp can also provide a MicroVAX computer together with networking hardware and software.

The FS is a high power microcomputer such as the Multitech 80386 based machines, Digital Equipment MicroVAX, PC Designs 12 MHz GV-286, AST Premium/286, compaq Deskpro 386, Access 386 manufactured by Advanced Logic Research, Inc., Fortune Systems 68020 based machines, Zenith Data Systems Z-386, and Counterpoint 68020 based machines.

CRTs are available from Amdek, Princeton Graphics, Wyse Technologies, NEC, and others.

Magnetic tape backup units are available from Kennedy DEI, Priam, Western Digital and others.

Large disk drives (40-660 megabytes) are available from Western Digital, Seagate, Priam, Maynard Electronics, Fujitsu, and others.

High speed (1200 to 19600 baud) modems are available from Everex, Hayes, Multitech Systems, U.S. Robotics and others.

The printer is available from companies such as Epson, Microline, and Toshiba.

DATABASE DESCRIPTION

The Company database 36 is a collection of interrelated files. The database format is relational, that is, a series of flat files (two dimensional tables). Although the format is relational, there are hierarchical relationships between the several files which will be described. The files are described below in terms of field name, field size, format and sequence criteria.

1. Product-Dealer (PD) Records

| Field Name | Size | Format |
|---|---|---|
| V-H(1) | 8 | Decimal |
| Telephone no | 10 | Decimal |
| Rating/State | 1 | Binary, Rating-2, State-6 |

Sequence is V-H and Telephone no. V-H are not individually unique but V-H combined with Telephone no. is unique. PD records are maintained on disk using maintenance and sequencing provided by the database package (e.g., ORACLE, UNIFY, INFORMIX, etc.) For processing inquiries, the complete PD file is loaded into the File Server RAM. When in RAM, the records are sequenced and searched by a proprietary file searching process.

The decimal format assumes representing the V-H as decimal digits interleaving a V digit, and an H digit from left to right for all eight V-H digits. This is described in detail under the section entitled "Application of the V-H Coordinate System".

The telephone number is the ten digit NPA-NNX-XXXX of the dealer. It is copied from the dealer record at database creation and update time.

The rating field is two bits. It can assume a value from 0-3 with 0 chosen as the default to be automatically entered by the system if no value is chosen by the client. It is an approximate measure of the dealer's sales which can be used to affect the choice of a dealer to whom to refer a call in case there are several equally likely dealers in the same geographical area.

The state field is 6 bits. It can assume a value from 0-63 which is sufficient to code the States of the United States and the Territories of Canada. The state field is expected to be available from the V-H file.

The PD record does not contain a field for advertiser or product. That is because ALL the records in a given PD file are for the same advertiser/product. The file name is the letter "F" followed by a four digit code for Advertiser and a four digit code for product within advertiser. For example, a file name could be F-1234-5678. This could mean, for example, "Panasonic", "Television". These field sizes allow for 10,000 advertisers each advertising 10,000 different products.

2. Dealer Records

| Field Name | Size | Format |
|---|---|---|
| Telephone no. | 10 | Decimal |
| V-H | 8 | Decimal |
| Name | 20 | ASCII |
| Address | 20 | ASCII |
| City | 15 | ASCII |
| State | 2 | ASCII |
| Zip | 9 | Decimal |
| Speak name | 20 | ASCII |
| Speak city | 20 | ASCII |
| Hours | 7 | Decimal |

Sequence is on telephone number which is assumed to be unique.

Telephone number and V-H are exactly the same size and format as used in the PD Records. In fact, the process of creating a PD Record is to copy the Telephone no. and V-H from a Dealer Record into a file of PD Records for a particular Advertiser/Product, e.g., "Panasonic Television".

The field sizes for Name, Address, and City are approximate. The database system may allow for variable length fields in which case these fields will be variable length. The dealer records will be created originally by purchasing lists of names for selected categories of SIC codes such as "Retail Trade-Appliances". Therefore, the field sizes if the CDSC does not use a variable field length database package will depend on the sizes provided by the list vendor.

Zip code is shown as a 9 byte Decimal field. This allows for nine digit zip codes.

"Speak name" and "Speak city" refer to the technology of Text-to-Speech conversion. The CDSC technology allows speaking the dealer's name and city to the caller if required by a client advertiser. The telephone number will be spoken by digital speech technology. The reason for the two different speech technologies is that speaking the telephone number only requires the storage of the digital recording of the digits from zero to nine. Digital storage representation of the dealer names and addresses would require a huge amount of storage in RAM and on disk. Digital storage of speech consumes about 3000 bytes per second of speech.

If and when required during the on-line processing, the dealer name and city will be converted from text-to-speech using the standard name and city fields as the source data for the text-to-speech algorithm. The quality of the synthetic speech is tested at database update time. If the output of the algorithm is unsatisfactory, the record provides the two speak fields where the data can be entered in a manner so as to produce better results when spoken using the text-to-speech algorithm. The data entry clerk will enter so-called "morphemes" such as are used in dictionaries to interpret pronunciation. When this special pronunciation field has data in it, the computer will use it to produce audible output instead of the regular field.

The hours field has seven bytes, one for each day of the week. Each one byte day field is composed of two nibbles, the "open" nibble and the "close" nibble. A nibble is a 4 bit character which is half of a byte. A nibble can represent 16 values which will be chosen to represent opening and closing times in intervals of one half hour. For example, the value 0 in the "open" nibble means 8:00 A.M. The value 15 in the "close" nibble means midnight. The value 00 for the byte means "closed all day". The value 1515 means "open 24 hours". The hours fields together with the time zones of the dealers are used to decide whether to call a particular dealer. If the hours fields when compared against the internal computer clock mean that the dealer is closed, a different dealer will be called if one is available. If another dealer is not available in approximately the same geographical area as the caller, the computer will take some alternate action chosen by the advertiser for the case of no open dealer available to answer a call. The same action applies if the dealer or dealers telephones are busy. An example of an alternate action is to ask the caller to call back at some other time. Another example is to read the dealer's name and telephone to the caller and ask him to call the dealer himself.

3. Advertisement Records

| Field Name | Size | Format |
|---|---|---|
| Dialed No. | 6 | Decimal |
| Extension | 4 | Decimal |
| Advertiser | 4 | Decimal |
| Product | 4 | Decimal |
| Advertisement | 4 | Decimal |

The Advertisement Records are sequenced on Dialed Number (excluding the 800) and Extension. The Advertisement Records are loaded into a lookup table. The argument into the table is the dialled number and extension. The function yielded is the Advertiser; the Product featured in the advertisement, and the description of the advertisement. An example of Advertiser is "Panasonic", an example of Product is "Television Set", and an example of Advertisement is "Time Magazine, Mar. 15, 1987, model #1234". This set of data uniquely identifies the advertisement and thus the product and advertiser to which the caller is responding.

In many cases, the Dialed No. will be the CDSC number e.g. 1-800-USA-DIAL and the extension number is the only unique designator which can differentiate calls relating to many different advertisers, products, and advertisements. In these cases, it is imperative to correctly acquire the extension number.

When soliciting the extension number, the computer will compare the received Touchtone ® digits against the Advertisement Records lookup table and verify that the number if valid. The computer may also speak the table entry to the caller and ask him to confirm that it is correct. The confirmation is performed by the caller entering a Y(es) or N(o) on this Touchtone ® pad. If the caller is using a rotary telephone, the procedure is described elsewhere under "Rotary Telephone Procedures". This confirmation procedure guarantees that the caller will be switched to a dealer of the correct product.

If the called number is provided by the advertiser (the advertisement does not feature 800-USA-DIAL) and is sufficient in the view of the advertiser to identify the advertiser, product, and advertisement, then it is not necessary to solicit the extension number. The called number which can be received automatically using the "Dialed Number Identification Service", (DNIS) feature of the Advanced 800 Services will be all that is required to identify the advertiser, product and possibly advertisement. The system looks up the DNIS number (or otherwise acquired dialled number) in the Advertisements Records look up table and will recognize that it is not necessary to solicit the extension. The indication that no extension is required is a blank entry in the extension field in the Advertisement Record in the lookup table. In this case, the processing resulting in a connection between the caller and dealer can proceed with no interaction at all between the computer and the caller when the feature of Automatic Number Identification is made available.

The situation also exists where the number is not 800-USA-DIAL but an extension is required in order to differentiate between several products and advertisements of a given advertiser.

In addition to being used in the on-line processing, the Advertisement records are used for billing and reporting.

4. Product Records

| Field Name | Size | Format |
|---|---|---|
| Advert'r Code | 4 | Decimal |
| Product Code | 4 | Decimal |
| Product Name | 20 | ASCII |
| Product Speak Name | 20 | ASCII |

The Product Records are sequenced on Advertiser Code and Product Code which, in combination, are unique.

The Product Record refers to a product of a particular advertiser. For example, a Product Record might refer to a Panasonic Television, not merely to any Television. The Advertiser Code (size 4) refers to e.g., Panasonic and the Product Code (size 4) refers to e.g., a Panasonic Television.

The Advertiser and Product Codes correspond to the fields with the same names in the Advertisement Records. The different records with corresponding fields are said in relational database technology to "join" on the fields. Given the Advertiser and Product codes from an Advertisement Record, one can retrieve the corresponding Product record. In database terminology, the records join on the advertiser and product fields.

The Product Records are used for billing and reporting.

5. Advertiser Records

| Field Name | Size | Format |
|---|---|---|
| Advrt'r Code | 4 | Decimal |
| Advrt'r Name | 20 | ASCII |
| Advrt'r Speak Name | 20 | ASCII |
| Advrt'r Adrs | 20 | ASCII |
| Advrt'r City | 20 | ASCII |
| Advrt'r State | 2 | ASCII |
| Advrt'r Contact Name | 20 | ASCII |
| Advrt'r Contact Telephone no | 10 | Decimal |
| Telephone Password | 12 | ASCII |

The Advertiser Records are sequenced on advertiser code which is unique.

The Advertiser Record describes a particular advertiser such as "Panasonic". The Product Record joins the Advertiser Record on Advertiser code.

The Advertiser Records are used for billing, reporting and correspondence. The record contains the password which is consulted when the advertiser makes a data call requesting his Call Record Journals (see following paragraph) to be transmitted to him by computer file transfer.

6. Call Record Journals (CRJs)

The CRJs are sequenced according to advertiser, product, advertisement and a special control number and the chronology of their generation.

The CRJs are generated after each call. They are used for billiing and for reporting and are available to the advertisers to perform their own advertising analyses. The CRJs are transportable to the advertisers either via a Packet Transport Network or can be mailed periodically on a diskette. The CRJs are also expected to be useful to the CDSC internal reporting.

A sequential control number is assigned to each inbound call, one per each new caller. This control number can be used to associate one inbound caller with several outbound calls. Several outbound calls might be made per one inbound call in the case of busy or no answer dealers.

The CRJ are maintained on disk until space requirements causes them to be written to magnetic tape. They are achieved on magnetic tape indefinitely. The CRJ format is:

| Field Name | Size | Format |
|---|---|---|
| Advrt'r | 4 | Decimal |
| Product | 4 | Decimal |
| Advrt'mnt | 4 | Decimal |
| Dealer telno (3 each) | 10 | Decimal |
| Caller telno | 10 | Decimal |
| Date rec'd | 6 | Decimal |
| Time rec'd | 6 | Decimal |
| Dlr call time (3 each) | 6 | Decimal |
| Dlr call result: (3 each) | | |
| no answer | 1 | Decimal |
| busy | 1 | Decimal |

-continued

| Field Name | Size | Format |
|---|---|---|
| time connected | 6 | Decimal |
| time hung up | 6 | Decimal |
| ATI RC | 1 | Decimal |
| ATI equipt | 2 | Decimal |
| Estimated miles, caller to dealer: | 4 | Decimal |
| Rotary or DTMF | 1 | Decimal |
| DNIS rec'd | 1 | Decimal |
| ANI rec'd | 1 | Decimal |
| Sequential no. | 3 | Decimal |

7. V-H File

This file is supplied by the Bell Communications Research Company. Given a Central Office Code (COC which is given as NPA-NNX) as the argument, it yields the V and H Coordinates. The V and H are each four digit numeric codes which taken together, are equivalent to the latitude and longitude of the COC. The codes are based on a projection which allows for distance computations without consideration of the earth's curvature. The worst case error is less than one percent when computing very large distances such as Bangor, Maine To San Diego, Calif. Because the CDSC system is oriented to "the nearest dealer", the expected error is close to zero. The distances are in airline (as the crow flies) miles.

The file is used to look up NPA-NNX and obtain V-H both for the Dealer Records and for the Caller Records. The database update procedure which occurs in the File Server computer uses the complete V-H record to contribute to the building of the Dealer Records. The division of labor between the PCs and the File Server is such that the PCs collect the data from the caller including the caller's NPA-NNX, dialed number, and possibly extension. This set of data is transmitted to the File Server which is responsible for the execution of the nearest neighbor algorithm. The File Server chooses one to three dealers nearby to the caller and sends them to the PC processing the call. The PC then outdials a dealer and orders the switching machine to cross-connect the incoming call to the out-going call. At the termination of the call, the switching machine notifies the File Server which generates and archives a CRJ.

8 Audio Name and Address Records

The capture of the caller's name and address is an optional feature of the CDSC service. This is done using digital recording techniques and storing the results on a large disk drive. The names and addresses must then be periodically transcribed by data entry clerks who play back the digital recordings and enter the corresponding name and address records in normal ASCII computer format.

9. ASCII Name and Address Records

These records are the results of transcribing the Audio records described in the previous paragraph.

10. Audio City Names

These records contain the digital recordings of the names of the cities taken from the V-H file. There is one audio name per city although there may be many records with the same name, e.g., NEWARK. These records must be created by speaking the city name into a microphone or telephone interfaced to a telephone management board and then uploading the digitized name from a PC to the File Server. If the processing requires that the city name be spoken to a caller, the audio file for the specific city is downloaded in real time from the File Server to a PC. The city name in ASCII is used as the file name for the digital recording of the name.

11. Processing Instructions

The processing instructions are a set of constants per each Advertiser-Product-Advertisement combination. The processing instructions tell the computer how to process telephone calls for this Advertiser-Product-Advertisement combination.

These constants are:

a. Maximum distance for call connection. (I.e., do not connect a caller with a dealer more than 50 miles away.)

b. Number of dealers in the continental USA.

c. Distance difference which is to be processed as equality. (For example, if there is a dealer eight miles from a caller and another dealer 11 miles from the caller, then they will be considered equidistant for the purpose of making a telephone connection or for delivering names and addresses and telephone numbers.) The system has a built in error of three miles due to the assumption that callers and dealers are located exactly at their V-H coordinates so that the minimum distance difference is at least three miles. The distance difference is expressed as a percentage and a minimum. For example, 15% or eight miles, whichever is smaller.

d. Options if all dealers are busy or don't answer:
 i. Speak a canned message asking them to call back at another time.
 ii. Speak the name, address, and telephone number of one or two or three approximately equidistant dealers.

e. Solicitation instruction re acquiring caller's telephone number if it is not automatically delivered:
 i. Ask for the first six digits
 ii. Ask for all ten digits f. Instructions re solicitation of other information, particulary numeric information which can be collected from Touchtone ® callers.

g. Special announcements to be delivered to callers such as "This is National Buy a Television Set week".

h. The digitally recorded names of the advertiser and the product.

i. Optional welcome message to be spoken to the caller.

j. Optional announcement to be spoken to caller when he is put on hold while the computer is dialling up a dealer.

k. Optional announcement to be spoken to the dealer informing him that a caller is waiting.

l. Optional solicitation from the caller as to whether he is inquiring re a product or service and identification thereof. This is required to differentiate between a call for service on a given product or a call to purchase the product.

m. Optional request to the caller to enter his name and address in audio for later transcription to a mailing list for follow up.

n. Procedure while caller is on hold—music on hold or silence with occasional message.

o. Optional monitoring by recording of occasional calls.

p. Procedures to follow if the caller does not have a Touchtone ® telephone. (He calls on a rotary telephone).
 i. Ask him to call back on a Touchtone ® telephone.
 ii. Give the caller a special number for rotary calls.
 iii. Connect the caller to a live operator.
 iv. Switch in the voice recognition equipment.

12. DN/EXT Table

The records in this table have the Dialled Number (DN) and Extension (EXT) as the argument. The function is the address of a Processing Instructions Record as described above in 11.

The DN is a required field. It may contain the CDSC's own number, 800-USA-DIAL or some other "foreign" 800 number supplied by the client. If the DN is 800-USA-DIAL, then the EXT is a required field which is needed in order to select uniquely the proper Processing Instructions Record.

If the DN is other than 800-USA-DIAL, then the EXT field is optional. If the EXT field is not present, then the DN alone identifies the Advertiser-Product and possibly the Advertisement and so to select a Processing Instructions Records.

If the EXT field is present, it represents a subdivision of the foreign other than 800-USA-Dial 800 number. This would be the case, for example, if the customer supplied the foreign 800 number and he was running multiple ads for several different products or several ads for the same product in different media or in different formats or any combination of the above.

Summarizing the DN/EXT, the DN/EXT is used to identify the advertisement or product to which the caller is responding and then to choose a set of instructions describing the method of processing the call. The DN may be the CDSC number in which case the EXT is required. If the DN is a foreign number, then the EXT is an optional field.

The first three digits of the DN are always 800 so are not represented in the table.

HIERARCHICAL RELATIONSHIPS OF THE SEVERAL FILES IN THE DATABASE

Figure 3:
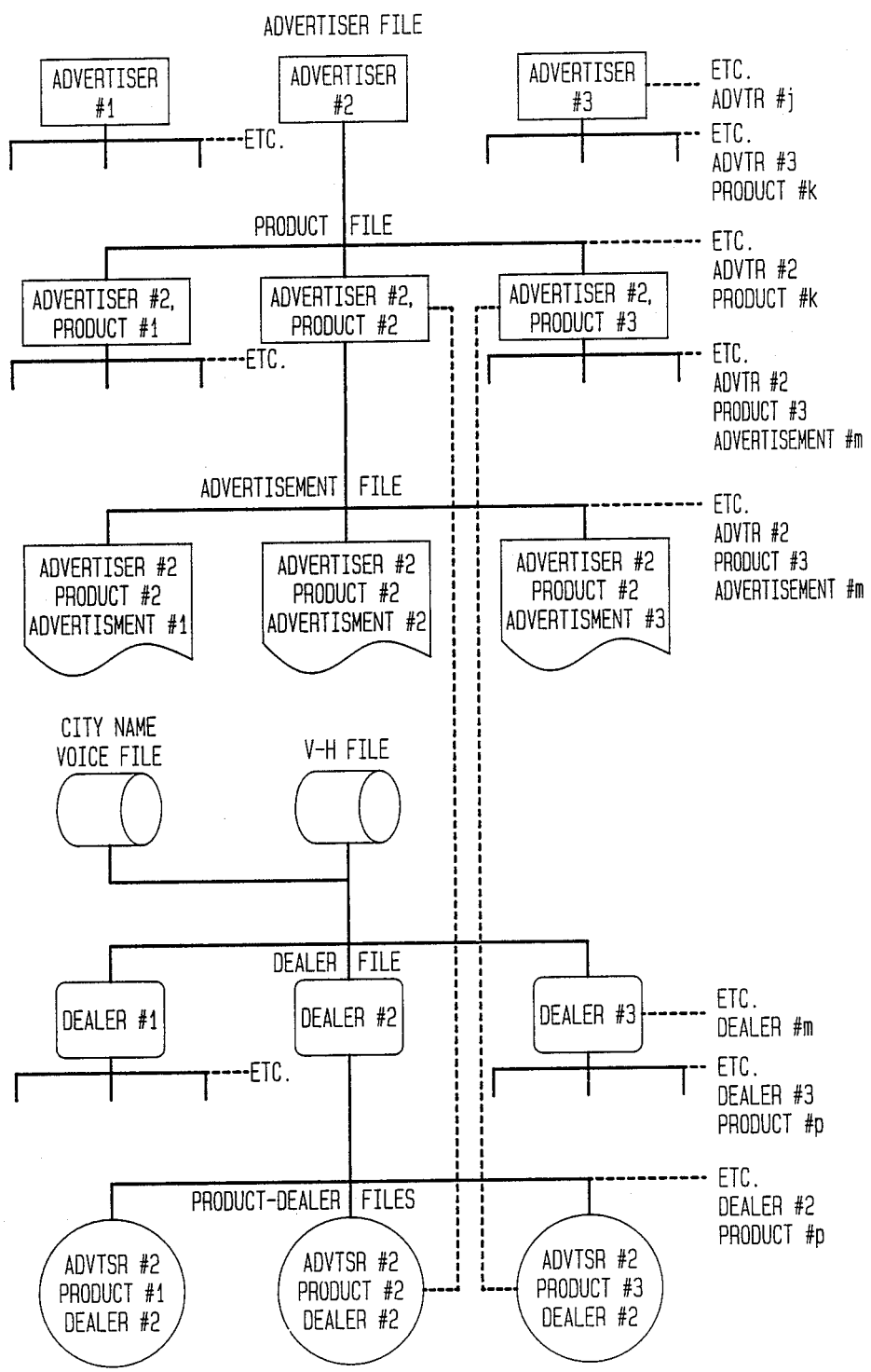
FIG. 3 is a chart of the relationships between the several files in the database.

Although the database employs a relational model, there is a natural hierarchical connection between the various types of files which is useful to understand. This is illustrated in FIG. 3.

The Advertiser File is at the top of the hierarchy. The diagram shows three advertisers, Advertiser #1, Advertiser #2, and Advertiser #3 (which are diagrammed explicitly with reference to other advertisers up to advertiser #;). An example of an Advertiser is "Panasonic".

In the diagram, Advertiser #2 is shown to manufacture several products which are described in the Product File. Products #1, #2, and #3 are diagrammed explicitly with reference to other products up to product #k of advertiser #2.

The Product File is at the next level below the Advertiser File. (Note that the particular Product File does not describe any arbitrarily selected product, only products manufactured by the parent Advertiser—in this case, Advertiser #2). The Product Records join the Advertiser Records the on Advertiser Code.

The diagram shows that several advertisements for Advertiser #2, Product #2 are concurrently in publication. Advertisements #1, #2, and #3 are diagrammed explicitly with reference to other advertisements up to advertisement #m.

The Advertisement File is at the next level below the Product Files. The Advertisement Records join the Product Records on Advertiser-Product Code.

The City Name voice file and the V-H file records are at the top of another hierarchy. The V-H file supplies records in the Dealer File with their V-H fields after matching on the first six digits of the Dealer's telephone number.

The Product-Dealer (PD) Files are diagrammed as subordinate to the V-H File and the Dealer Files. The Product records supply the NAME (File Identifier) of the PD files. The only identification of the product in a Product file is the file name.

Information about the product does not appear in individual PD records. For example, a Product-Dealer file would exist for Panasonic—Television. The PD records in the Product-Dealer file would consist (primarily) of the telephone numbers and V-H coordinates of the dealers in Panasonic Televisions. They also include state code and sales rating. No individual PD record has any reference to Panasonic—Television.

The diagram shows three Product-Dealer Files, one for each of three products—#1, #2, and #3 of Advertiser #2's. In the illustration, Dealer #2 is a dealer in all three of the products. Therefore, each of the three files would contain a record with the telephone number and V-H of Dealer #2.

Describing the hierarchy from the bottom up, the PD records are the primary data used to conduct the nearest neighbor algorithm. A PD record represents one product of one advertiser retailed by one dealer. Having used the PD records to locate a nearest neighbor, the PD record is joined to the corresponding dealer record on telephone number in order to check for hours of operation or to deliver the dealer name, and address, to a caller. The PD record has the selected dealer's telephone number so it is not necessary to join a PD record to a dealer record except that the dealer records contain the hours of operation. Otherwise, the PD records alone would be sufficient to make the caller-dealer telephone connection.

Note that the PD records point to the dealer records but that the dealer records don't point back to the PD records. In other words, it is not possible, without special processing, to tabulate all the products or advertisers represented by a given dealer. This can be done but it would require special processing.

The PD records do not have a field which explicitly joins them to the Advertiser-Product Records. Rather, it is the NAME (File Identifier) of the file in which the PD Records reside that identifies them as being related to a particular Advertiser-Product.

The Advertiser-Product Records can be joined to their parent records in the hierarchy which are the Advertiser Records.

The Advertiser Records are at the top of the hierarchy.

DATABASE UPDATE PROCESSING

Figure 4A:
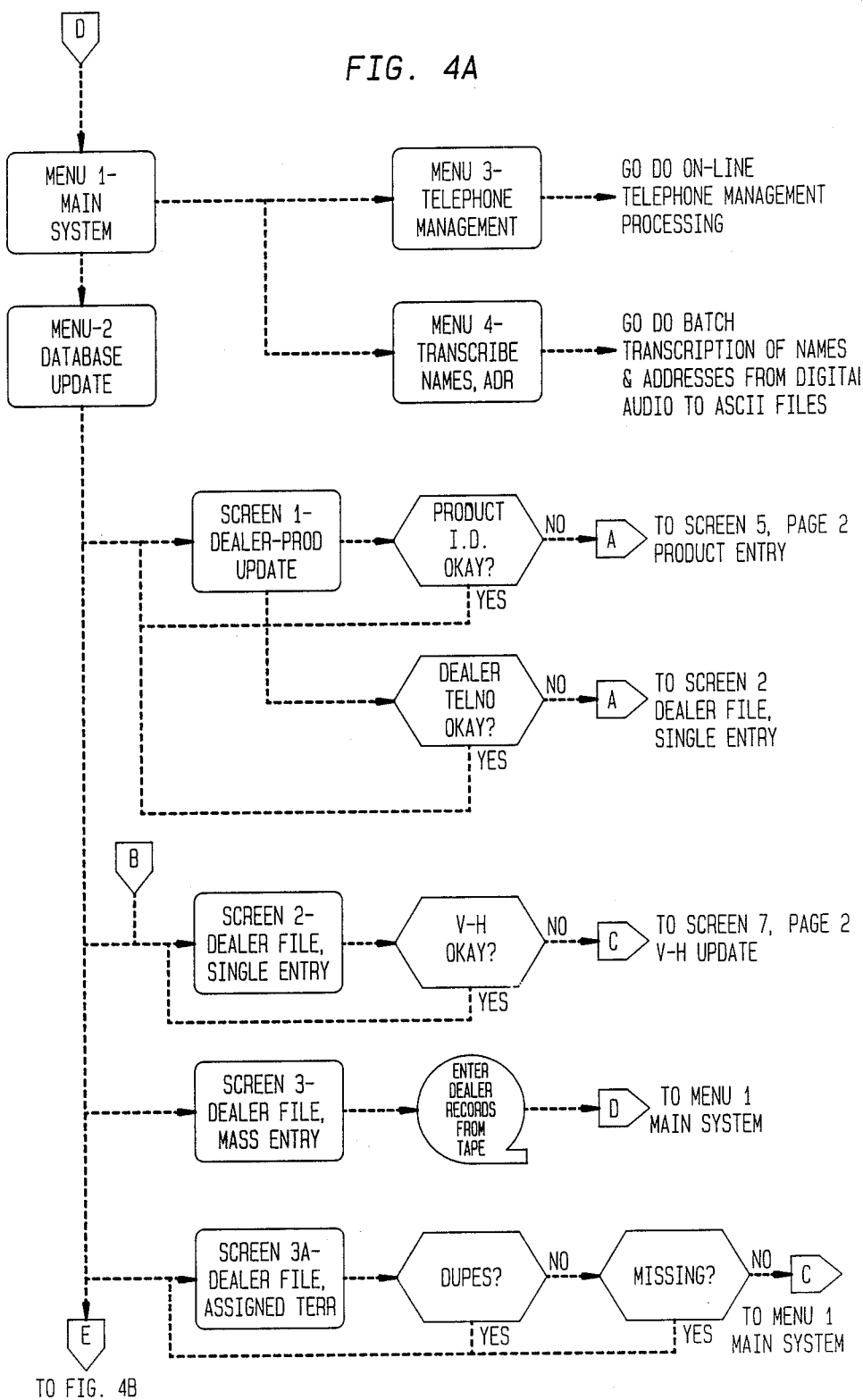
FIGS. 4A and 4B comprise a flow chart of the Database Update Procedure.
Figure 4B:
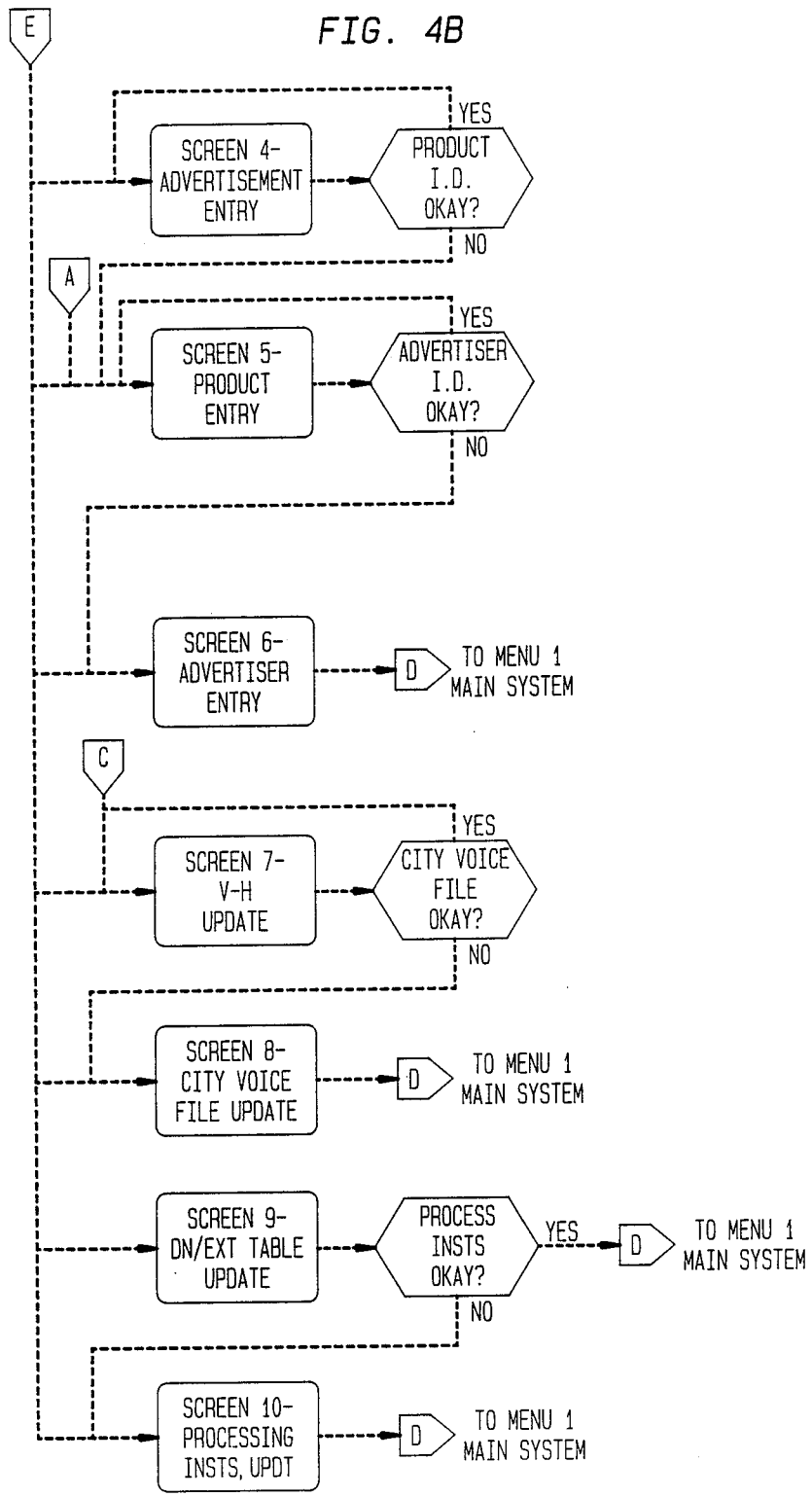
Figure 5A:
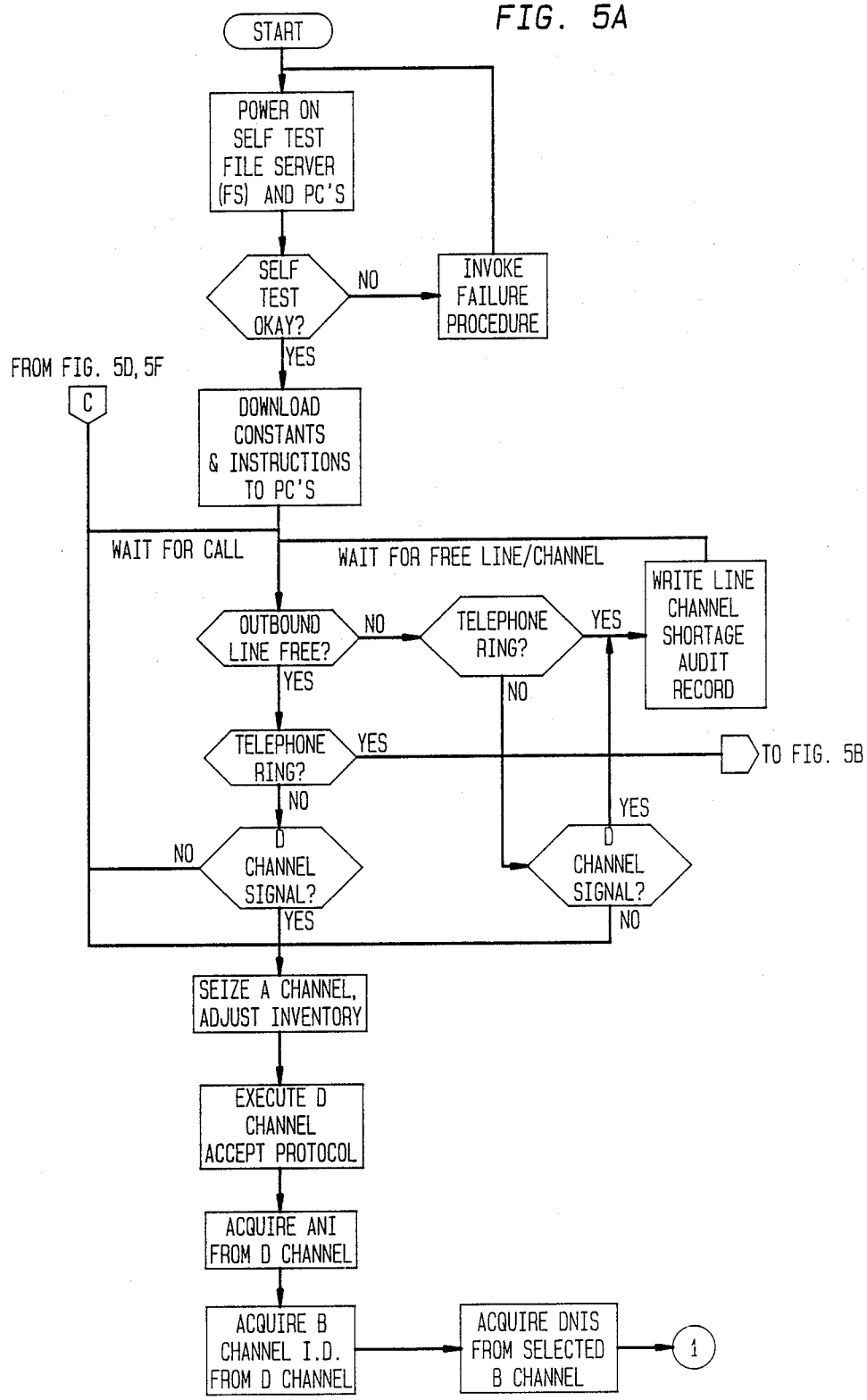
FIGS. 5A–5F comprise a flow chart of the Call Processing procedure in a Rounting Center (RC).
Figure 5B:
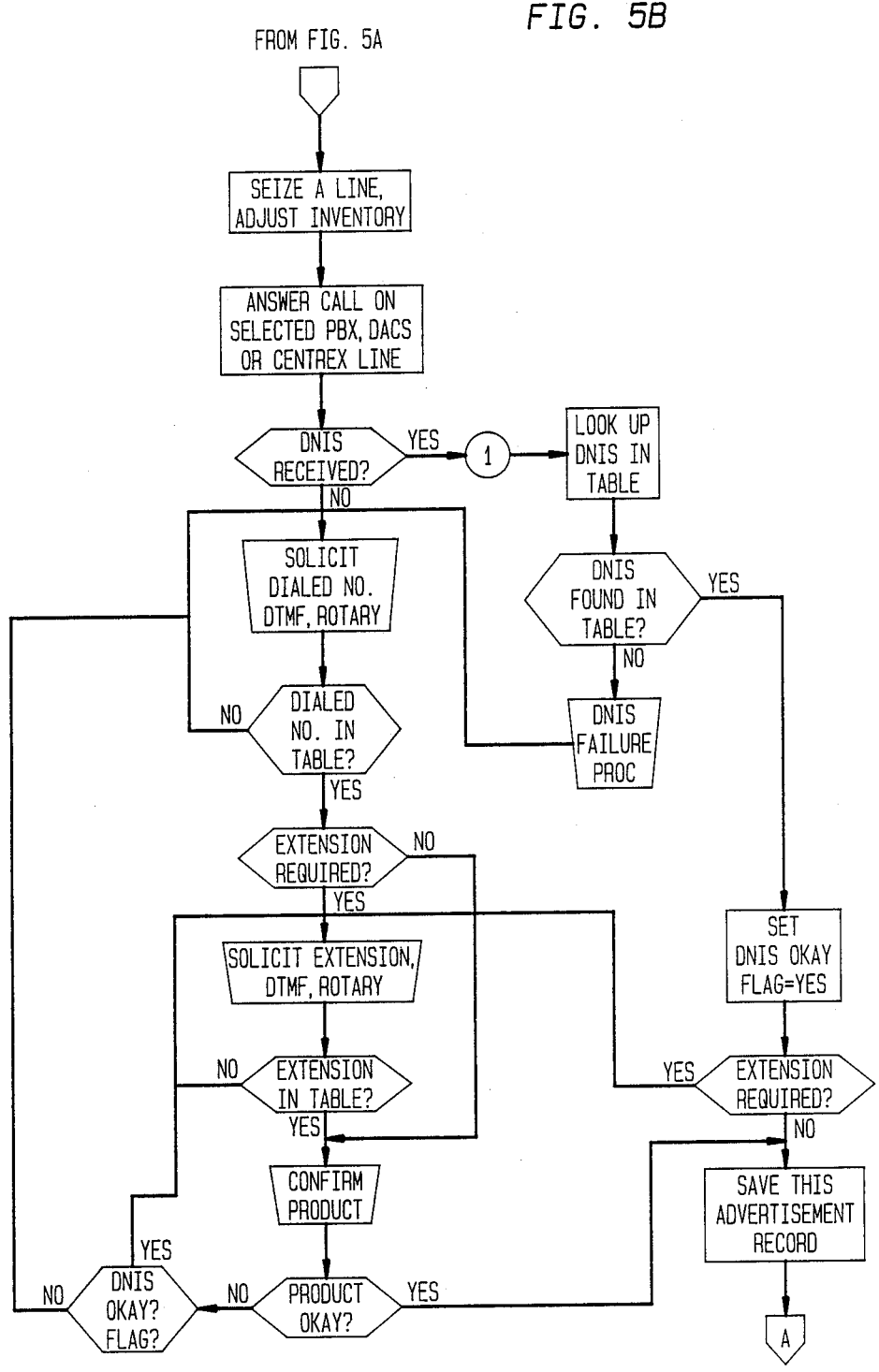
Figure 5C:
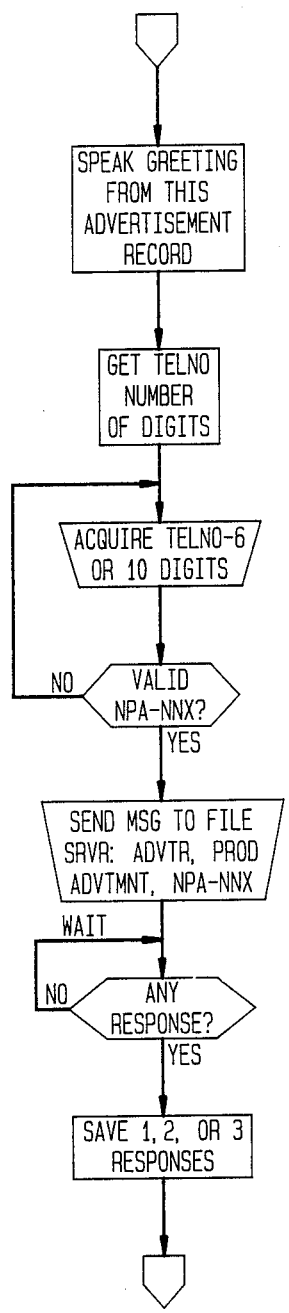
Figure 5D:
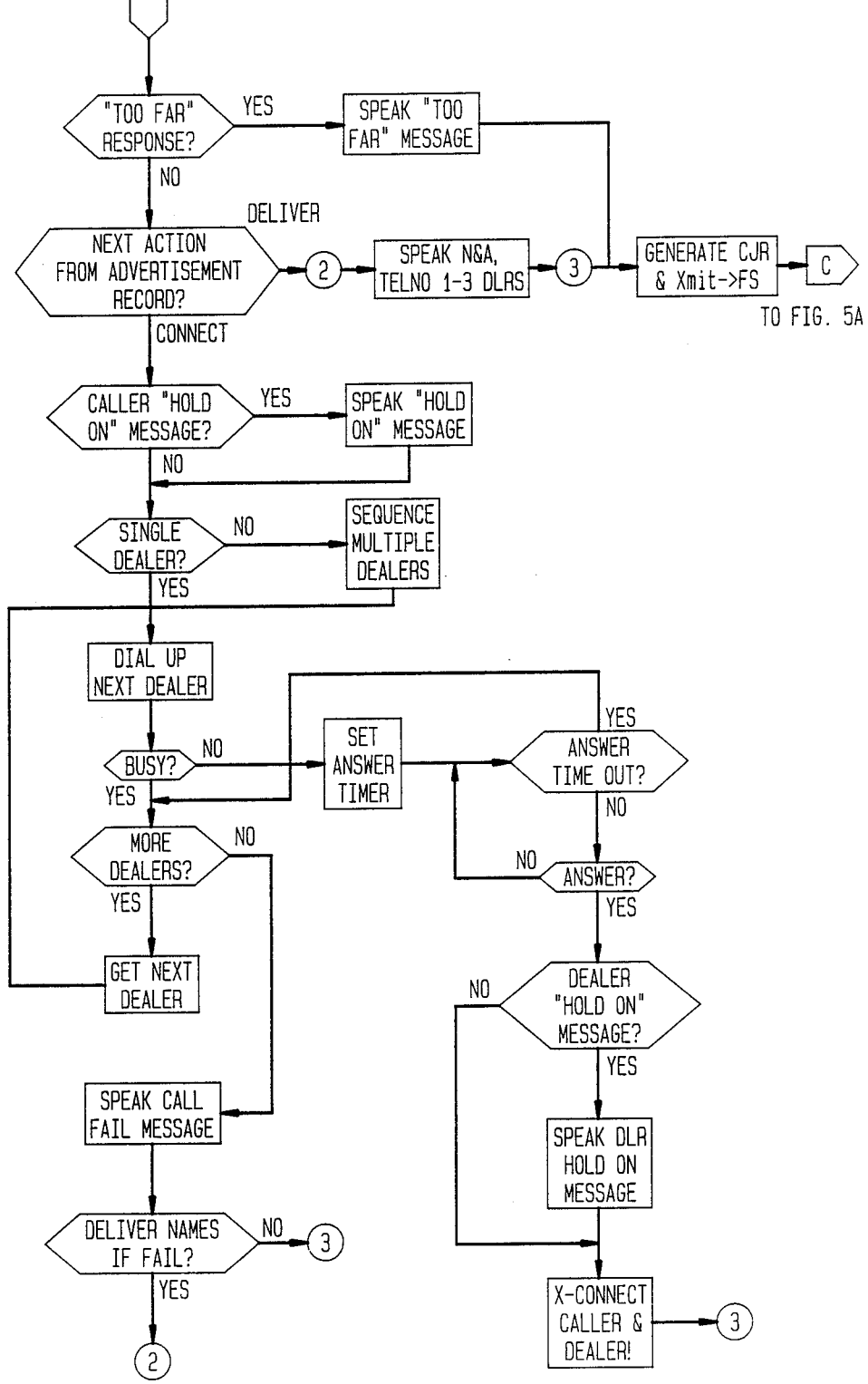
Figure 5E:
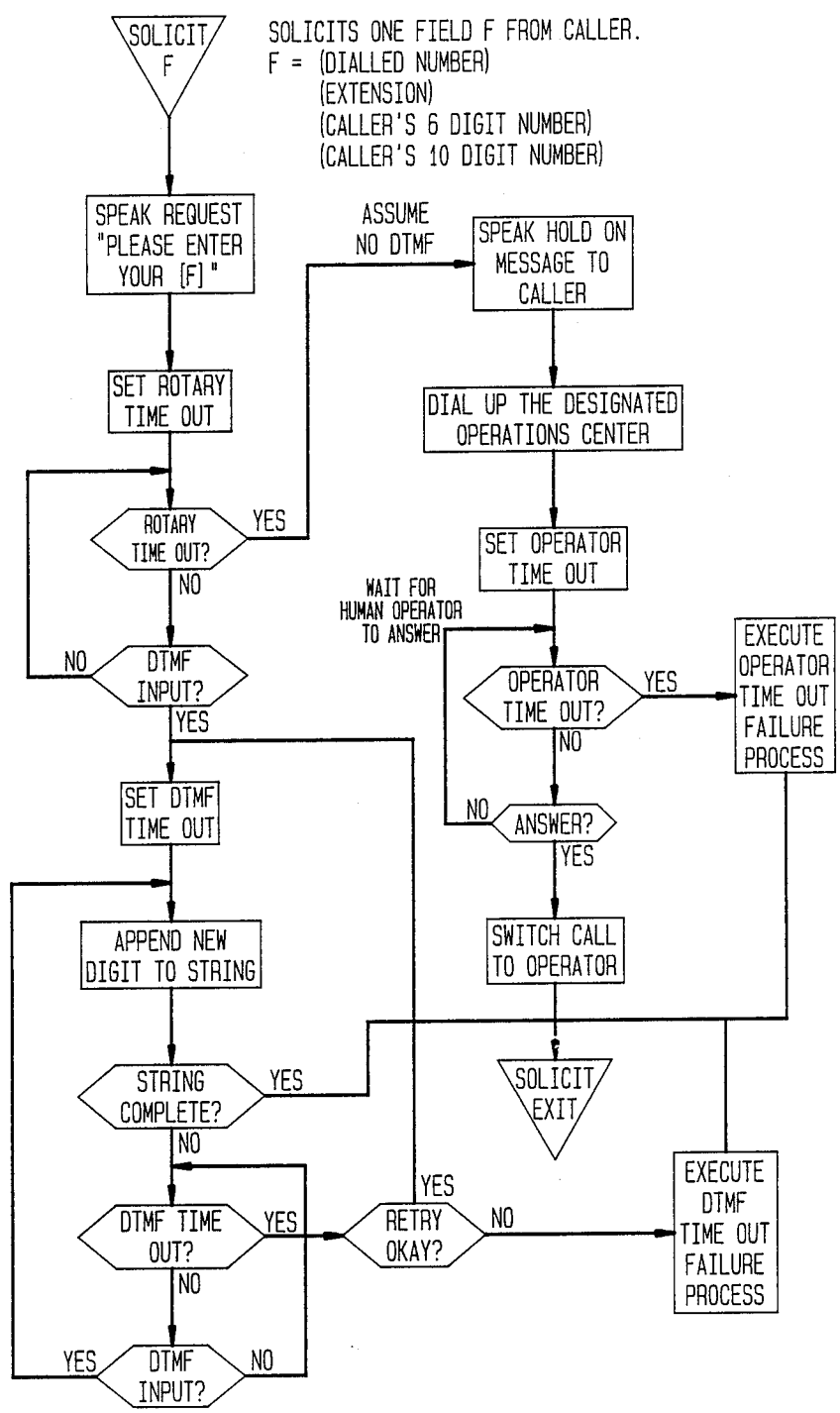
Figure 5F:
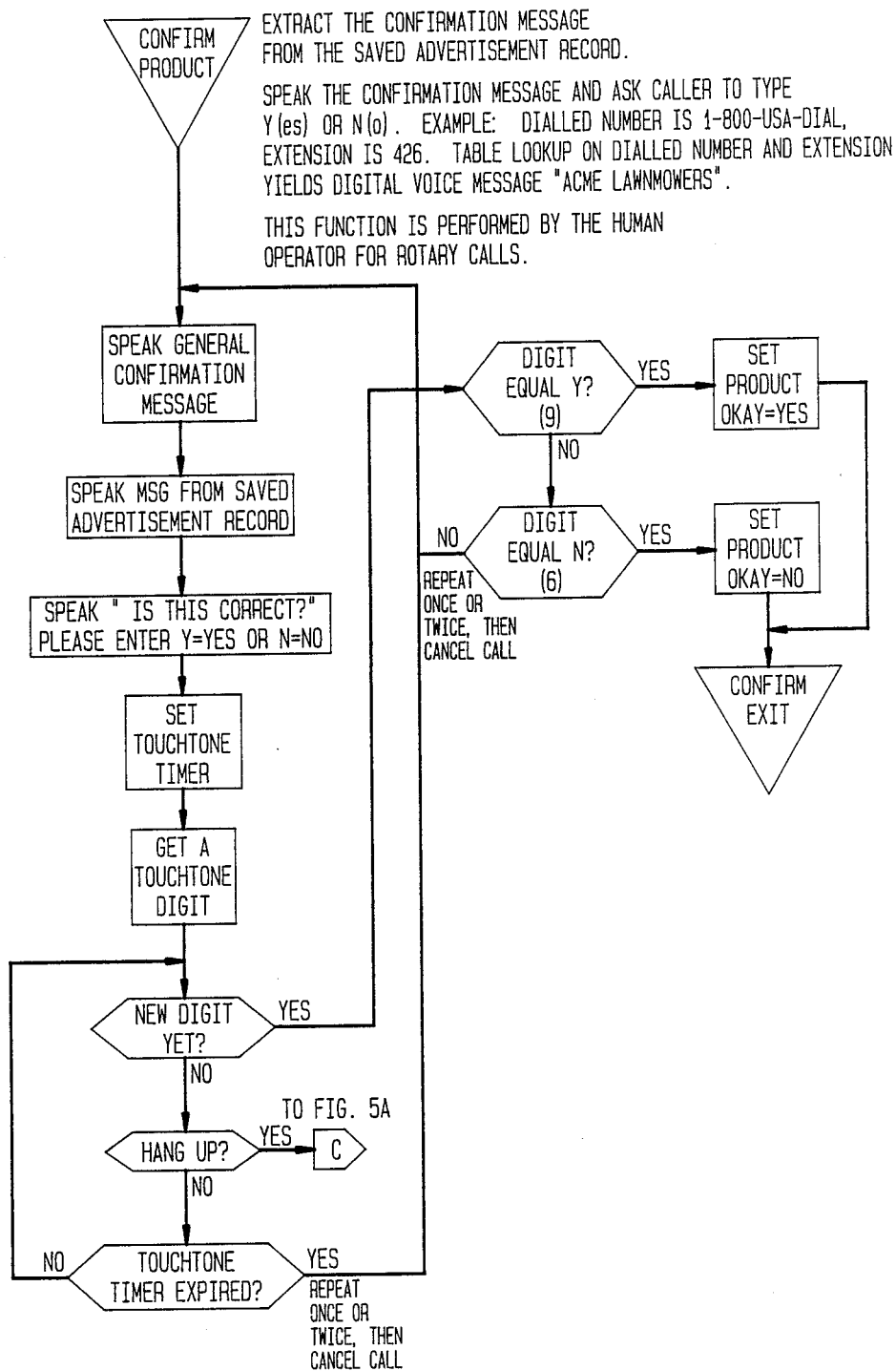
Figure 6D:
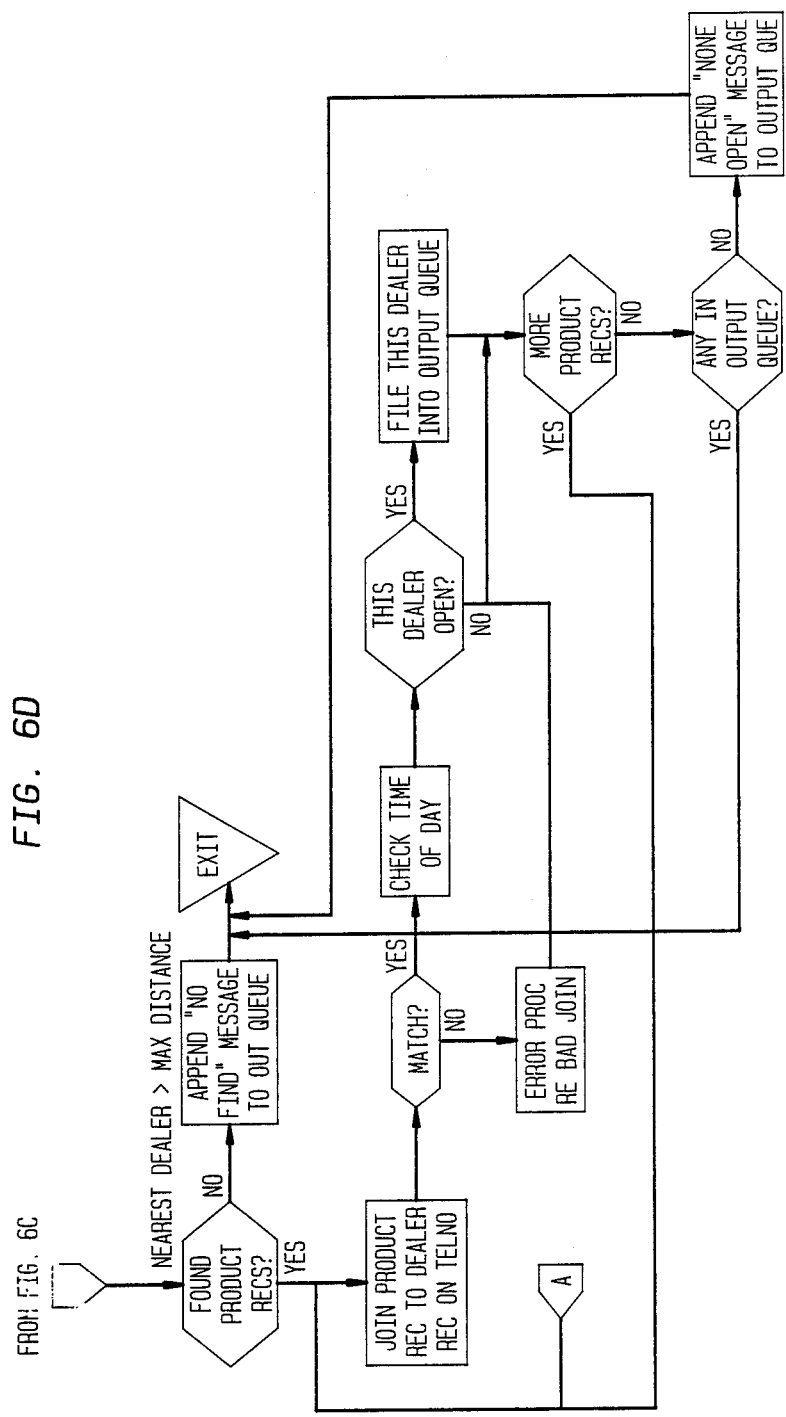
Figure 6G:
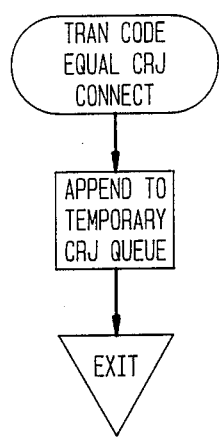
Figure 6F:
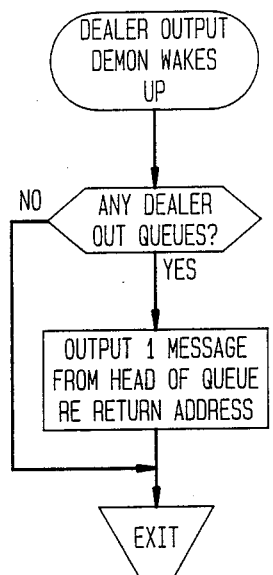
Figure 6E:
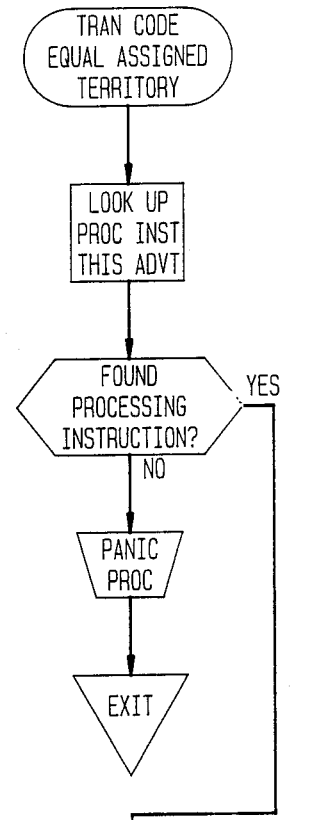
Figure 6H:
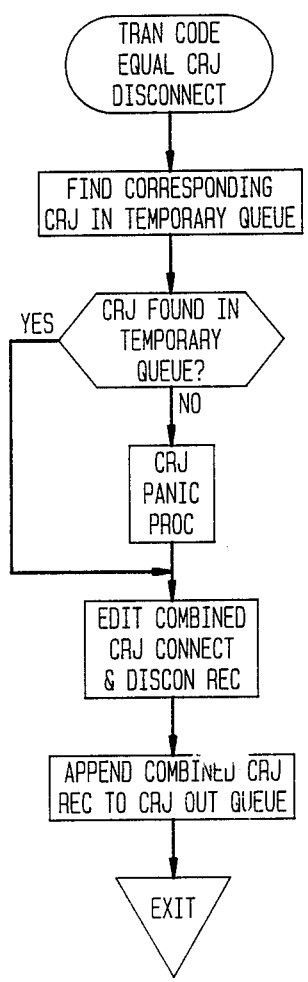
Figure 6I:
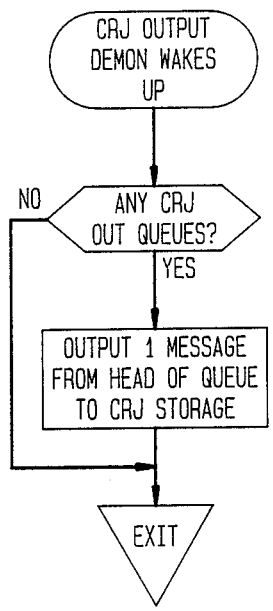
Figure 1:
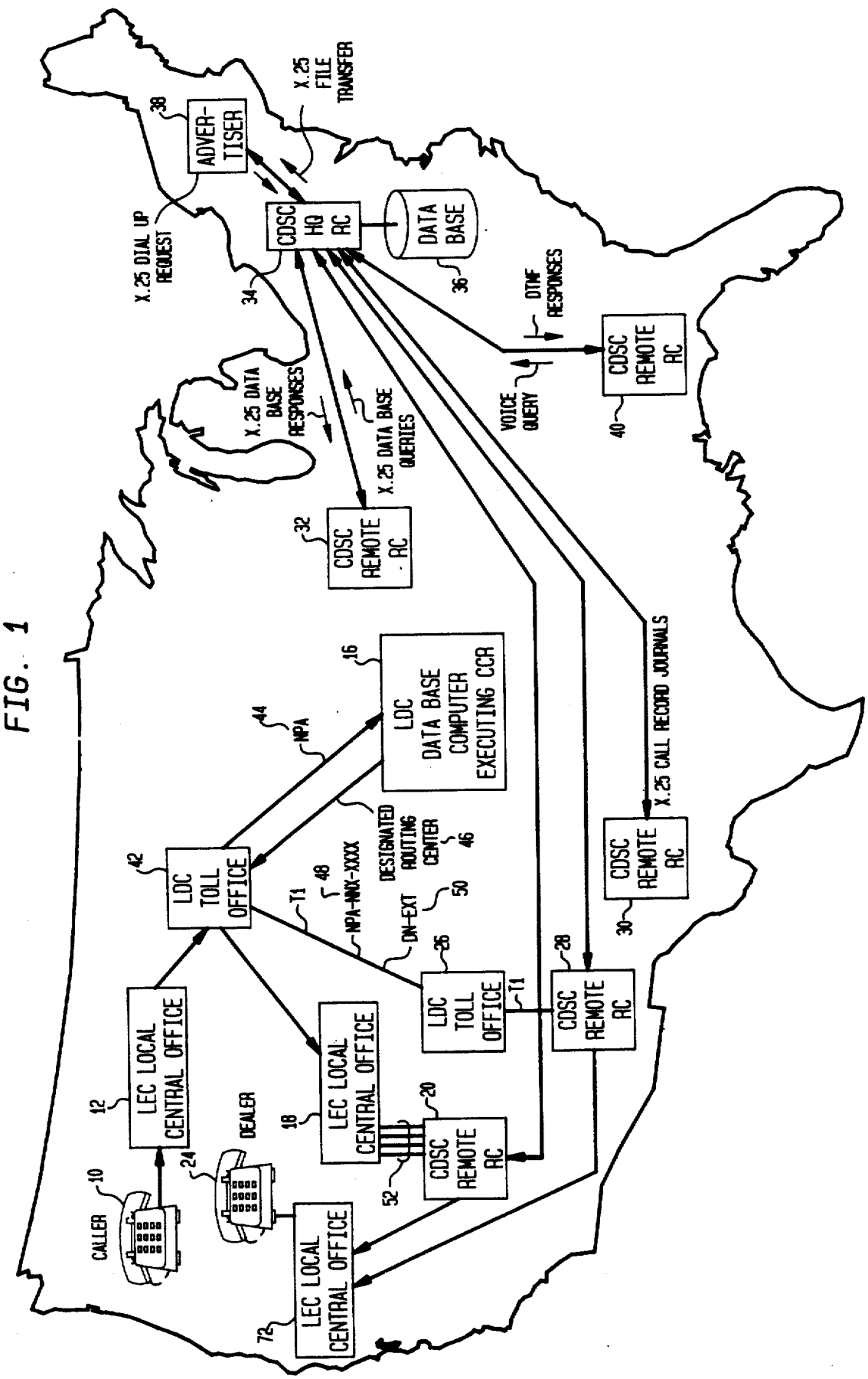

FIGS. 4A and 4B outline the menus and screens of the system, their sequence of presentation, and their interdependencies.

The database system exhibits "referential integrity". For each subordinate record entered, the system guarantees that its superior record, (if there is an existing subordinate-superior relationship) exists. Likewise, for each superior record proposed for deletion, the system checks to ensure that there are no subordinate records depending on it.

If the data entry action would violate the referential integrity, the system invites the data entry clerk to either skip the record in question or to enter the record required to maintain the referential integrity.

For example, for Screen 2, the dealer entry screen, there must be a V-H record available so that the V-H fields of the V-H record can be copied into the dealer record. If the system learns by an unsuccessful search of the V-H file on the dealer's NPA-NNX that there is no V-H record corresponding to this dealer record, it will invite the data entry clerk to update the V-H file before proceeding with this particular dealer record.

The assumption is made that the files will be introduced into the database in a "top-down" hierarchical fashion so that the referential searches will probably be successful.

TRANSACTION PROCESSING

FIGS. 5A-5F and 6A-6I diagram the transaction processing which occurs in the front end computers and the file server respectively.

HQ & REMOTE CENTER CALL PROCESSING

FIGS. 5A-5F diagram the transaction processing that occurs in the telephone management front end computers when a telephone call arrives for service. The primary tasks of the front end computers are to acquire the necessary data items and send them to the file server and then to process the Product-Dealer records sent back by the file server. The necessary data items required to process a call are the caller's six or ten digit telephone number, the originally dialed 800 number, and, optionally, the extension.

These data items are sent to the file server which processes them against the database in order to select one or several product-dealer records which include the dealer's telephone number. The file server sends the selected dealer record or records to the front end computer from which the caller's query was received. The front end computer then extracts the telephone numbers from the product-dealer records, out-dials the dealer, repeats the process for another dealer if necessary, (in case of a busy or no answer) and then cross-connects the caller with the dealer.

The front end computer uses the dialed number and optionally the extension to locate the Processing Instructions record to be used for this call. It consults the Processing Instructions record for the procedures to be followed in all eventualities which might be encountered in the processing. For example, the Processing Instructions record will state the procedure to be followed in the event that there is no dealer within a reasonable distance from the caller. It also contains the procedure to be followed in case the caller is calling on a rotary (not Touchtone ®) telephone.

The front end processing is on-line in real time. The telephones will be answered and the processing initiated almost immediately. However, once the data has been acquired and sent to the file server, the front end must wait until the file server responds with the selected dealer records before proceeding with the call.

The front end computer is aware of whether it is in the Headquarters configuration or a remote configuration. It uses this knowledge to communicate with the file server either locally or remotely via a data link.

FILE SERVER TRANSACTION PROCESSING

FIGS. 6A–6I diagrams the processing that occurs in the file server. The file server has a copy of the same Processing Instructions as the front end computer. Therefore its actions are coordinated with the front end in functions such as the maximum distance from caller to dealer and the number of dealers to be selected.

The file server is serving several front end computers. Its response to the queries from them is less real-time oriented than the front ends must be.

It queues up transactions and operates on them in an asynchronous manner. It will sacrifice some response time to an individual transaction in order to maximize overall throughput.

The phrase "demon wakes up" in the figures refers to the periodic scheduling of the processing programs by the operating system. The operating system is a UNIX multi-tasking, multi-user, multi-processor system whereas the front end computers are DOS single user machines.

Whereas the front end computers are concerned with interfacing with callers and exchanging information with them, the file server is executing the application function which is chiefly locating dealers nearby to callers. It also is programmed to select dealers based on assigned territories as well as geographical distance.

The file server is responsible for generating and archiving the Call Record Journals and for connecting the caller portion of the record to the called dealer portion of the record. It will also relate the caller name and address record to the Call Record Journal.

APPLICATION OF THE V-H COORDINATE SYSTEM TO THE DEALER LOCATOR PROGRAM

The V-H (Vertical-Horizontal) Coordinate System was originated by the Bell System in 1960 to determine rate mileage on toll messages. It employs the Donald Elliptic Projection which enables distance between points identified by their V-H coordinates to be calculated accurately without consideration of the earth's curvature. The CDSC system uses this coordinate system as delivered by the Bell Communications Research Company of Piscataway, N.J.

The origin of the coordinate system is northeast of Nova Scotia at V-H coordinates 0000,0000 and runs to southwest of California at coordinates 9999,9999. Thus, there are 100,000,000 distinct coordinate points covering most of Canada, the continental United States, and Mexico.

The area of a square with dimensions of one coordinate unit by one coordinate unit is one tenth of a square mile. The dimensions in feet of the square unit are then the square root of one tenth of a square mile on a side which is approximately 1670 feet.

The coordinate system provides the NPA-NNX (Central Office Code) and the associated V-H coordinates of every telephone central office in the USA and Canada and parts of Mexico. Given the argument of COC, the system can search the V-H file and retrieve the coordinates of a caller or dealer and can compute the distance between them easily and accurately. The formula is d=square root (delta v squared plus delta h squared). Delta v squared is the caller's v minus the dealer's v, the difference squared. Delta h squared is the caller's h minus the dealer's h, the difference squared. The distance in miles between any two points in the coordinate system is the d (above) times the square root of one tenth which is approximately 0.3162277. This procedure yields distances with worst case errors of less than one percent.

The assumption inherent in this procedure is that both the caller and the dealer are located at their respective telephone central offices which, of course, is not true. It is approximately true because telephones are linked to their central offices by copper wire loops which can extend only about three miles without requiring amplification equipment. Therefore, the average caller or dealer is approximately 1.5 miles from the central office serving his telephone.

The dealer locator system employs a novel variation on the V-H system. The coordinates, V and H are each four digit numbers. Considering V as $V_3, V_2, V_1, V_0$ and H as $H_3, H_2, H_1, H_0$. The system assigns coordinates to callers and dealers which are the result of interleaving the V and H so that the assigned coordinates are not the original V and H but instead $V_3H_3, V_2H_2, V_1H_1, V_0H_0$.

Now consider that the $V_3H_3$ coordinate pair defines a system of grid blocks. There are one hundred of these blocks whose coordinates range from 00 identifying the northeast corner block to 99 identifying the southwest corner block. The block numbering proceeds in a southerly and westerly direction. These blocks are defined as Class A blocks.

Within each Class A block, the $V_2H_2$ coordinate pair defines a system of 100 grid blocks. These blocks are also numbered from 00 identifying the northeast corner block to 99 identifying the southwest corner block. The block numbering proceeds in a southerly and westerly direction. These blocks are defined as Class B blocks.

Within each Class B block, the $V_1H_1$ coordinate pair defines a system of 100 grid blocks. These blocks are also numbered from 00 identifying the northeast corner block to 99 identifying the southwest corner block. The block number proceeds in a southerly and westerly direction. These blocks are defined as Class C blocks.

Within each Class C block, the $V_0H_0$ coordinate pair defines a system of 100 grid blocks. These blocks are also numbered from 00 identifying the northeast corner block to 99 identifying the southwest corner block. The block numbering proceeds in a southerly and westerly direction. These blocks are defined as Class D blocks.

The purpose of interleaving the V digits with the H digits so as to create the system of Class A, B, C, and D blocks is to translate from a linear array such as would be presented by a straight sequencing on V and H into a two dimensional array.

The dealer records are written to disk sequentially according to the interleaved V-H. When the dealer file is written on the disk drive using the interleaving scheme, the result is that dealers in the same geographical area will tend to be in the same disk file area.

This can be seen by assuming that the dealers are arranged on the disk in straight V-H order and there is one dealer who is in a Class D block exactly beneath another Class D block. There would be 10,000 Class D blocks between the two dealers in a linear array whereas in this described scheme, both dealers would tend to be in the same Class D block. If not in the same Class D block, then they would tend to be in the same Class C block. If not in the same Class C block, they would tend to be in the same Class B block. If not in the same Class B block, they would tend to be in the same Class A block.

The worst case arises when two entities (i.e., dealers or callers) reside on different sides of a vertical Class A block boundary but this is still preferable to the array that would result from a sequencing on straight V and H. To examine the worst case, assume that one entity is adjacent to the east of the boundary of Class A block $V_nH_m$ and another entity adjacent to the west of this boundary in the Class D square adjacent to the first entity. Then, geographically, they would be one unit apart but in the database, they would be separated by all the entries falling in the V column of the first entry remaining to Class A blocked $V_nH_9$ proceeding in a southerly direction and continuing with the entries of $V_0$, $H_m+1$ to $V_n+1$, $H_m+1$. In this case, the system would sense that it is required to make a new database read, thus skipping over whatever dealer records might occupy the 10,000,000 units intervening between the two adjacent records.

The goal of the dealer searching method is to find the desired number of dealers nearby to the caller while minimizing the disk searching, minimizing the number of distance calculations, and minimizing the computation per distance calculation.

To perform a search in the continental USA for d (e.g., 3) dealers nearby to a caller c, the system first constructs a square with c as the center. The dimensions, (sides a and b) of the square are computed as a function of the number of dealers in the file located in the USA and of the number of dealers desired to be yielded by the search.

The USA is covered by approximately half (50,000,000) of the V-H units, so that if an advertiser has D dealers, there are D/50,000,000 per unit. Then, a square with c at the center containing 50,000,000/D units would be expected, on the average, to contain one dealer. A square with 50,000,000/D units has dimensions $a \times b$, ($a=b$) where a and b are equal to the square root of 50,000,000/D. If more than one dealer (e.g., J) is to be located in the search, then for J dealers, the dimensions of the square are $a=b=\mathrm{sqrt}\ (J(50,000,000/d))$. Given c as the center, then the northeast corner of the square with c as the center has the coordinates $v=c_v-a/2$, $h=c_h-a/2$. The southwest corner has the coordinates $v=c_v+a/2$, $h=c_h+a/2$. The search begins at the northeast corner and proceeds to the southwest corner. If no dealer records fall between these two corners, a new larger square is computed and the process is repeated. A buffer is assigned to receive the records yielded by the search from the northeast corner to the southwest corner of the square surrounding c. If so many records are yielded as to overflow the buffer, a new smaller square is computed and the process is repeated. This process continues until the number of dealer records yielded by the search is greater than or equal to J and less than or equal to the number of buffer slots allocated to receive them.

The algorithm for adjusting the block size must be guaranteed not to oscillate between searching blocks which are too small and blocks which are too large. The algorithm remembers the adjustment, upward or downward, to the dimensions of the square. The algorithm halves or doubles the adjustment for each new computation of a square. Conceivably, an adjustment of one unit upward may result in buffer overflow followed by an adjustment of one unit downward yielding insufficient records. In this case, provision is made to randomly discard records so as to finish the search without overflowing the buffer. Another procedure computes approximate distances "on the fly" and discards those records seen to be farther away from the caller than others which are saved in the buffer. The search will terminate without oscillating when the adjustment is halved so as to be equal to one unit. When computing an adjustment, fractions are rounded up to the next integer.

After saving the desired number of records in the buffer, the system computes the "square distance in units" of each dealer to the caller. It is not necessary to compute the actual distance as the minimum square units distance will also be the minimum distance in miles.

When the system has found the d dealer record or records with the minimum square units distance to the callers, it will then compute the actual distance taking into account the square root and the multiplication by 0.3166 to convert from units to miles.

When the system finds multiple dealers approximately equidistant to the caller, it must choose between them if only one is specified by the processing instructions for the particular product delivering several dealer means to the caller is a viable choice, then this paragraph does not apply unless there are so many that choosing several of them is a problem.

The file server will examine the hours of operation of the dealers and only send records for open dealers to the telephone management computer. This will minimize "no answers".

The system will have several algorithms to choose one dealer from among several which might be yielded by the search. It can generate a random number to choose from any number of dealers. For example, for five dealers, the computer will generate a random number from 0 to 1.0. The first dealer is selected if the random number ranges from 0 to 0.2, the second by a number from 0.2 to 0.4, etc.

The above scheme can be weighted by a constant inserted in the dealer record indicating, e.g., last year's sales of the product being called.

A "computer compass" can be programmed for each product. The compass needle revolves around 360 degrees every x minutes where x is a constant available for choice by the advertiser. The dealer will be selected on the basis of being the closest in terms of the compass heading when the choice algorithm is executed.

If multiple dealers are present and there is a busy when the dealer is called the system will try the next dealer. This will continue until all of the multiple dealers have been called.

This describes an approximation method using the V-H coordinate system for locating a desired number of dealers nearby to a caller. There are several errors to be acknowledged while reiterating that this is an approximation method not a rigorous, provable algorithm. The first error arises from the assumption that the dealers are distributed evenly across the V-H units. This is, of course, not true as it assumes the same dealer distribution density in deserts as cities. The second error is due to the calculation of the coordinates of the northeast and southwest corners. These will always result in blocks slightly larger than desired as the method does not account for the row and the column containing the caller c. Note that the square around c will always have an odd number of units in the a and b dimensions. The distances are always in airline miles, the system does not consider driving a car over available roadways. The assumption that the caller and dealer are located at the central office serving their telephones also induces error.

ALTERNATIVE EMBODIMENT OF THE INVENTION

An alternative embodiment of this invention is a computer owned by the customer dealer service company connected by a data link to the LDC database computer where the translation of 800 numbers to standard telephone numbers is performed. An acceptable translation process is described by U.S. Pat. No. 4,191,860, Mar. 4, 1980, issued to Roy P. Weber, Bridgewater, N.J. assigned to Bell Telephone Laboratories, Murray Hill, N.J.

The function performed by the database processing is to intercept calls to 800 numbers and to translate the 800 telephone numbers into standard 10 digit telephone numbers. In telephone company terminology, this is called translating "WATS to POTS". This function is primarily a table lookup in a one-to-one table. For each 800-xxx-xxxx number, there is one and only one corresponding NPA-NNX-XXXX with the possible exception of one alternative number. There are also other choices of NPA-NNX-XXXX which are based on time-of-day, percentage distribution of calls and other criteria.

The database process receives its input from a Packet Transport Network (PTN) dedicated to processing call-setup data. This network is called the Common Channel Interoffice Signalling (CCIS) Network. The CCIS PTN is separate and distinct from the voice network but is parallel to it. The concept of a separate data call for voice call setup is called Out-of-Band Signalling as distinct from In-Band Signalling wherein the network control data for call setup is carried in the same channel as the voice call itself.

In the alternative embodiment, the LDC database processor would be supplied by the CDSC with a listing of the 800 telephone numbers which are owned by the CDSC customers and which are to be processed by the CDSC instead of the LDC database processor. When the LDC database processor finds these CDSC numbers in the process of performing its WATS-to-POTS function, it recognizes that the calls representing these numbers are to be switched to the CDSC computer for processing. The LDC database processor would set up a data call to the CDSC computer and transmit the dialled 800 number plus the caller's NPA-NNX-XXXX or at least the caller's NPA-NNX (the first six digits of the caller's telephone number). Given this input over the data link from the LDC database processor, the CDSC computer would look up the advertisement (and consequently, the product) represented by the 800 number and also the V-H coordinate of the caller. Using the information as to the product, the CDSC computer would select a file of dealers for that product.

Using the V-H coordinates of the caller, the CDSC computer would select a record or records from the chosen file representing a dealer nearby or nearest to the caller. The computer would extract the 10 digit POTS number for this dealer from the CDSC database record of dealers and send it to the LDC database processor over the data link. The LDC database processor would then be in possession of a POTS number as if it had obtained it by itself in its standard manner. The LDC database processor would transmit the POTS number through the network to the point in the network where the call would be placed to the POTS number. Assuming that the network can sense a busy or no answer condition and relay this information back to the LDC processor, the call would then re-link to the CDSC computer. The CDSC computer would chooose another POTS number and relay it to the LDC computer which would forward it in turn to the point where the cell is placed to the dealer. This process would continue until the call was answered or until the CDSC computer used up all of its dealer records for dealers nearby to the caller.

Another solution to the case of busy or no answer would be to forward all of the nearby dealer telephone numbers to the LDC database processor with a protocol for choosing the sequence in which to place the calls in case of busy or no answer. In this embodiment, the caller would place an 800 call in response to an advertisement and would be immediately connected to the nearest dealer of the advertised product without human intervention. This applies to both Touchtone ® and rotary calls.

The concept of allowing the public to access the telephone network with the same facility as the telephone company itself is referred to as "Comparably Efficient Interconnection" and also as "Open Network Architecture". These two words are not rigorously defined nor are they in a vigorous stage of implemenation which would make the preferred embodiment described herein a possibility.

At the present time, the major LDC network declines to allow potential users to communicate directly with its database computers. Until this policy is revised, this preferred embodiment will remain a goal rather than an actuality. Also, the LDC database processor only receives the NPA (first three digits of the telephone number) of the caller whereas the present invention depends on the first six digits (NPA-NNX) to perform the advanced routing function of selecting the nearest dealer for a specified product. When advanced network features are installed, in particular, Automatic Number Identification (ANI), then the full 10 digit number of the caller will be available to the network and to the company computers.

GLOSSARY OF ABBREVIATIONS

This disclosure makes use of certain abbreviations which have the following meanings:

| | |
|---|---|
| ANI | Automatic Number Identification - a feature of the long distance network. It passes the telephone number of the calling party into the network where it is then available for processing. |
| ASCII | American Standard Code for Information Interchange - a seven level code capable of representing 128 different characters. |
| CO | Central Office - the facilities and equipment owned by the local telephone company. |
| COC | Cental Office Code - the 4th to 6th digits of a ten digit telephone number. |
| CCR | Custom Calling Routing - a call routing service provided by the long distance communications carrier. |
| CDSC | Customer/Dealer Service Company - this is an organization that performs certain services described herein. |
| CRJ | Call Record Journal - a record of a telephone call including data such as calling number, called number, date, time, and duration. |
| CPE | Customer Premises Equipment - as distinct from equipment located in the offices of the telephone company. |
| CRT | Cathode Ray Tube - a computer display device. |
| DACS | Digital Access and Cross Connect System - a device which receives multi-channel telecommunications input, demultiplexes the input, and remultiplexes the output |

-continued

| | |
|---|---|
| | to different channels. |
| DID | Direct Inward Dialling - a feature of a PBX which allows inbound calls to a specific station thereby bypassing the receptionist station. |
| DN | Dialled Number - the 800 number originally dialled by a caller to the CDSC. |
| DNIS | Dialled Number Identification Service - a service offerred by the LDC which automatically identifies the DN to the recipient of the call. |
| DTMF | Dual Tone Multi-Frequency - the generic term for "Touchtone". |
| EXT | An extension to the DN. |
| FEC | Front End Computer. |
| FDX | Full Duplex - a channel which allows simultaneous communications in two directions. |
| FS | File Server - a computer which operates on the database. |
| HQ | Headquarters - the main routing center operated by the CDSC. |
| ISDN | Integrated Services Digital Network - an array of new equipment, protocols, facilities, and services which will, when implemented, allow for certain telecommunications features described herein. |
| Kbs | Kilobits per second - a data transfer rate of 1000 binary digits per second. |
| LAN | Local Area Network. |
| LATA | Local Area Transport Arrangement - a local telephone company term referring to service within its own area as distinct from long distance service. |
| LDC | Long Distance Telecomminications Carrier - the long distance telephone company. |
| LEC | Local Exchange Telecommunications Carrier - the local telephone company. |
| LIC | LAN Interface Card. |
| MTD | Magnetic Tape Drive. |
| NNX | As in NPA-NNX, where NPA is defined below. The NNX refer to the COC so that NPA-NNX are the first six digits of a ten digit telephone number. The NNX are the 4th to 6th digits of a ten digit telephone number. |
| NPA | Number Plan Area - the first three digits of a telephone number, also called the area code. |
| PC | Personal Computer. |
| PBX | Private Branch Exchange. |
| POTS | Plain Old Telephone Service - as distinct from, e.g., WATS. |
| RC | Routing Center - a computer center operated by the CDSC. |
| SIC | Standard Industrial Classification Code |
| TDM | Time Division Multiplexing - a technique which divides a single communications line into a series of repeating multiple slots. For example, the T1 technology referred to in this application divides a single line into 24 channels or time slots, each of which occupies about .75 micro-seconds. |
| TIC | Telephone Interface Card. |
| UCD | Uniform Call Distribution - the PBX feature which distributes incoming calls to available stations. |
| V-H | Vertical-Horizontal - a geographic coordinate system derived from latitude and longitude. The V-H system was created by the long distance telephone company for the purpose of billing telephone calls on a point-to-point airline miles distance basis. |
| WATS | Wide Area Telephone Service - a long distance telephone service provided both on an outbound basis and an inbound basis. The inbound service is commonly referred to as "800 service". |

While the invention has been described with reference to the preferred embodiment thereof it will be appreciated by those of ordinary skill in the art that various modications can be made to the parts and steps that comprise the invention without departing from the spirit and scope thereof.

I claim:

1. A system for routing a telephone call from a first party who dials a telephone number including digits uniquely characteristic of a given item to a nearby second party out of a group of second parties who can supply said given item, the telephone system comprising:
   first routing means for routing said telephone call to a telephone service center relatively near said first party;
   location determining means for determining the location of said relatively nearby second party based at least in part on the telephone number dialed by said first party; and,
   second routing means for routing said telephone call from said first party through said telephone service center to said nearby second party who can supply said item.

2. The system of claim 1 wherein said first routing means comprises:
   means for determining the originating telephone number of said first party; and,
   means for routing said telephone call to said telephone service center based upon said originating telephone number.

3. The system of claim 2 wherein said location determining means comprises:
   a second party data base representing at least some of said group of second parties;
   comparison means for comparing at least some of the digits of said telephone number dialed by said first party against said second party data base to determine the shortest distance between said first party and said nearby second party.

4. The system of claim 3 wherein said second routing means comprises:
   means for automatically generating a second telephone number and dialing said second telephone number to connect said first party to said second party through said telephone service center.

5. The system of claim 4 wherein said means for determining the originating telephone number of said first party comprises an Automatic Number Identification (ANI) means.

6. The system of claim 5 wherein said second party data base comprises a vertical-horizontal file.

7. The system of claim 6 wherein said comparison means compares the area code (NPA) and the local central telephone office code (NNX) against said vertical-horizontal file.

8. The system of claim 7 wherein said second parties comprise dealers in said items and wherein said first party comprises a potential customer of said dealer for said item.

9. The system of claim 8 wherein said item comprises a product.

10. The system of claim 8 wherein said item comprises a service.

11. A method for routing a telephone call from a first party who dials a telephone number including digits uniquely characteristic of a given item to a nearby second party out of a group of second parties who can supply said item, said method comprising the steps of:
   (a) first routing of said call to a telephone service center;
   (b) determining the location of a relatively nearby second party based upon the telephone number dialed by said first party; and,
   (c) second routing of said call to said relatively nearby second party.

12. The method of claim 11 wherein step (b) further comprises the step of:

(d) comparing at least some of the digits of the telephone number dialed by said first party against a data base representing at least some of said group of second parties to determine the shortest distance between said first party and said nearby second party.

13. The method of claim 12 wherein step (a) further comprises the steps of:
(e) determining the originating telephone number of said first party; and,
(f) performing said second routing of said call to said telephone service center based upon the originating telephone number determined in step (e) above.

14. A system for routing a telephone call from a potential customer who has an originating telephone number and who dials a telephone number including digits uniquely characteristic of a given item to a nearby dealer out of a group of dealers who can supply said item, said system comprising:
first routing means for routing the originating telephone number of said telephone call to a telephone service center relatively near said potential customer;
location determining means located at said telephone service center for determining the location of said nearby dealer based at least in part upon the telephone number dialed by said potential customer; and,
second routing means for routing said telephone call from said potential customer to said nearby dealer of said item.

15. The system of claim 14 wherein said first routing means includes:
means for determining the originating telephone number of said potential customer; and,
means for routing said telephone call to said telephone service center based upon said originating telephone number of said potntial customer.

16. The system of claim 15 wherein said location determining means comprises:
a dealer data base representing at least some of said dealers; and,
comparison means for comparing at least some of the digits of said telephone number dialed by said potential customer against said dealer data base to determine the shortest distance between said potential customer and said dealer.

17. The system of claim 16 wherein said second routing means comprises:
means for automatically generating a second telephone number and dialing the same to connect said potential customer to a nearby dealer through said telephone service center.

18. The system of claim 17 wherein said dealer data base comprises a vertical-horizontal geographical file of said dealers.

19. The system of claim 18 wherein said means for determining the originating telephone number of said first party comprises an Automatic Number Identification (ANI) means.

20. A system for routing a telephone call from a first party who dials a telephone number, including digits characteristic of a given item to a nearby second party out of a group of second parties who can supply said given items, said telephone sustem comprising:
first party telephone number determining means for determining the originating telephone number of said first party;
determining means for determining the location of said nearby second party based at least in part on the telephone number dialed by said first party; and,
routing means connected to said location determining means for routing said telephone call from said first party to said nearby second party who can supply said item.

21. The system of claim 20 wherein said telephone number comprises an 800 number type of telephone number and said telephone system further includes:
a WATS to POTS conversion means for converting said 800 number to a POTS number.

22. The system of claim 20 wherein said location determining means conprises:
a second party data base representing at least some of said group of second parties;
comparison means for comparing at least some of the digits of said telephone number of said first party against said second party data base to determine the shortest distance between said first party and said nearby second party.

23. The system of claim 22 further comprising:
billing means for producing bills based upon the number of telephone calls placed to said second parties.

24. The system of claim 23 wherein said billing means further includes means for producing reports of telephone activity between said first parties and said second parties.

25. The system of claim 24 wherein said second party data base includes a vertical-horizontal file.

26. The system of claim 25 wherein said second parties comprise dealers in said items and wherein said first party comprises a potential customer of said dealer for said item.

27. The system of claim 26 wherein said item comprises a product.

28. The system of claim 26 wherein said item comprises a service.

29. The system of claim 20 wherein said routing means further includes:
means for automatically generating a second telephone number and dialing said second telephone number to connect said first party to said second party through a customer/dealer service company (CDSC).

30. The system of claim 20 wherein said first party telephone number determining means includes an Automatic Number Identification (ANI) means.

31. The system of claim 20 wherein said first party telephone number determining means comprises a human operator who solicits said first party telephone number from said first party.

32. The system of claim 20 wherein said routing means is connected by a network connection to the long distance carrier (LDC).

33. The system of claim 32 further including:
further routing means for routing said telephone call to another second party if the first second party called does not answer within a predetermined period of time.

34. A system for placing an order for an item based upon a telephone call from a first party who dials a telephone number, including digits characteristic of said item to be delivered to a second party from a nearby third party out of a group of third parties who can supply said given items, said telephone system comprising:

second party telephone number determining means for determining the telephone number of said second party;

location determining means for determining the location of said nearby third party based at least in part on the telephone number dialed by said first party; and;

routing means connected to said location determining means for routing said telephone call from said first party to said third party nearby said second party who can supply said item.

35. The system of claim 34 wherein said item comprises a gift for said second party.

36. The system of claim 35 further comprising:
billing means for billing said first party for said gift.

37. A telephone system for routing a telephone call from a first party who dials a telephone number including digits characteristic of a given item to a nearby second party out of a group of second parties who have exclusive territories for said items based at least in part on the telephone number dialed by said first party; and, routing means connected to said location determining means for routing said telephone call from said first party to said second party with said exclusive territory.

38. A telephone system for routing a telephone call from a first party who desires an item and who dials a telephone number to a nearby second party out of a group of second parties who can supply said item, said telephone system comprising:

item identification means for identifying the item designated by said first party;

first party telephone number determining means for determining the originating telephone number of said first party;

location determining means for determining the location of said nearby second party based at least in part on said originating telephone number of said first party and the identify of said item as identified by said item identification means; and, routing means connected to said location determining means for routing said telephone call from said first party to said nearby second party.

39. The telephone system of claim 38 wherein said item identification means includes voice recognition means for at least partially identifying said item from voice information from said first party.

40. The telephone system of claim 38 wherein said item identification means identifies said item at least partially from the telephone number dialed by said first party.

41. The telephone system of claim 40 wherein said telephone number comprises a standard telephone number (NPA-NNX-XXXX) plus an extension.

42. The telephone system of claim 38 wherein said item identification means human operator.

* * * * *

REEXAMINATION CERTIFICATE (1470th)
United States Patent [19]
Riskin

[11] B1 4,757,267
[45] Certificate Issued May 21, 1991

[54] TELEPHONE SYSTEM FOR CONNECTING A CUSTOMER TO A SUPPLIER OF GOODS
[75] Inventor: Bernard N. Riskin, Lambertville, N.J.
[73] Assignee: Applied Telematics, Inc., Wayne, Pa.

Reexamination Request:
No. 90/002,151, Oct. 1, 1990

Reexamination Certificate for:
Patent No.: 4,757,267
Issued: Jul. 12, 1988
Appl. No.: 64,127
Filed: Jul. 17, 1987

[51] Int. Cl.⁵ .............................................. H04M 3/42
[52] U.S. Cl. .................................... 379/113; 379/201; 379/219
[58] Field of Search ......................... 379/113, 201, 219
[56] References Cited

U.S. PATENT DOCUMENTS

| Number | Date | Inventor | Class |
|---|---|---|---|
| 3,692,946 | 9/1972 | Budrys et al. | 179/18 BA |
| 3,881,060 | 4/1975 | Connell et al. | 179/5.5 |
| 3,920,908 | 11/1975 | Krans | 179/2 CA |
| 3,928,728 | 12/1975 | Moriyama et al. | 179/18 FH |
| 4,191,860 | 3/1980 | Weber | 179/18 B |
| 4,277,649 | 7/1981 | Sheinbein | 179/18 B |
| 4,310,726 | 1/1982 | Asmuth | 179/18 B |
| 4,442,321 | 4/1984 | Stehman | 179/18 EB |
| 4,577,066 | 3/1986 | Bimonte et al. | 179/18 B |
| 4,611,094 | 9/1986 | Asmuth et al. | 179/7.1 TP |
| 4,611,096 | 9/1986 | Asmuth et al. | 179/18 B |
| 4,649,563 | 3/1987 | Riskin | 379/97 |
| 4,763,191 | 8/1988 | Gordon et al. | 358/86 |
| 4,797,818 | 1/1989 | Cotter | 364/401 |
| 4,797,910 | 1/1989 | Daudelin | 379/67 |
| 4,807,023 | 2/1989 | Bestler et al. | 358/86 |
| 4,817,129 | 3/1989 | Riskin | 379/88 |
| 4,827,500 | 5/1989 | Binkerd et al. | 379/88 |
| 4,852,154 | 7/1989 | Lewis et al. | 379/105 |
| 4,897,867 | 1/1990 | Foster et al. | 379/94 |

OTHER PUBLICATIONS

Cohen, D. et al "Distributed Database Management in a Highly Reliable Distributed Communications Network", Proceedings of the International Conference on Communications '84, IEEE, New York, v. 2, pp. 738-742, 1984.
Fohl, M. E. "TRS Rate Computer", Conference Record—International Conference on Communications, 14th, Toronto, Ontario, Jun. 4-7, 1978, published by IEEE, New York, New York, 1978, v. 3, pp. 37.4.1-37.4.3.
Giloth, P. K. et al "Planning for Attractive New Network Services", Pacific Computer Communications '85, edited by Kim, K. H. et al, Elsevier Science Publishers B.V., North-Holland, 1986, pp. 187-193.
Haas, C. W. et al "Stored Program Controlled Network: 800 Service Using SPC Newwork Capability—Network Implementation and Administrative Functions", The Bell System Technical Journal, vol. 6, No. 7, Sep. 1982, pp. 1745-1757.
Lee, T. "Emergency Calling System for the Twin Cities Area", Telecommunications, Int'l Edition, vol. 15, No. 7, Jul. 1981.
Muller, N. J. "In the Service of Better Networks", Computer & Communications Decisions, Hayden Pub. Co., Inc., vol. 17, pp. 50, 54, Oct. 1985.
Raack, G. A. "Customer Control of Network Services", IEEE Communications Magazine, vol. 22, No. 10, Oct. 1984, pp. 8-14.
Sheinbein, D. (I) "Direct Services Dialing Capability: A New Network Capability", Proceedings of International Conference on Communications '82, IEEE, New York, pp. 1F.4.1-1F.4.5, 1982.
Sheinbein, D. et al (II) "Stored Program Controlled Network: 800 Service Using SPC Network Capability", The Bell System Technical Journal, vol. 61, No. 7, Sep. 1982, pp. 1737-1744.
Weber, R. P. "Inward WATS Enhancements Utilizing SPC Network Capabilities", Proceedings of the 7th Annual National Telecommunications Conference, IEEE, New York, pp. 39.2.1-39.2.5, 1978.
Weismiller, F. et al "Direct Services Dialing: A New Synergy Between Public & Private Services", Proceedings—IEEE Military Communications Conference, IEEE, New York, v. 2, pp. 365-369, 1983.
Wolfe, R. M. "A Distributed Data Base to Support 800 Service", Proceedings of International Conference on Communications '82, IEEE, New York, pp. 1F.2.1-1F.2.3, 1982.
Hester, S. D. et al., "The AT&T Multimode Voice Systems—Full Spectrum Solutions for Speech Processing Applications", Proc. 1985 AVIOS Conf., Sep. 1985, 10 pages.
McIntyre, Harris B. "What is This New V-H System?", Background for Management, No. 33, Dec. 1959 (New England Telephone & Telegraph Company).
Mulla, H. and J. F. Vaughan, "Application of Speech Recognition and Synthesis to PABX Services", Electrical Communications (ITT), vol. 59, No. 3, May 6, 1985.

Primary Examiner—S. D. Schreyer

[57] ABSTRACT

A telephone system automatically connects a potential customer with a nearby dealer who can provide the goods or services desired by the potential customer. The potential customer first dials an "800"-type number which preferably includes digits uniquely characteristic of the product or service desired. The system identifies the originating telephone number of the potential customer and a computer initially routes the call to a specific customer dealer service company (CDSC) office in the general vicinity of the potential customer. The specially equipped CDSC HQ office includes a vertical-horizontal (V-H) file listing each dealer by product/service and equivalent of longitude/latitude. A comparison is performed between the telephone number of the potential customer and the data in the V-H file to find 1-3 selected dealers nearby to the potential customer. The system then automatically dials the telephone number of the closest dealer thereby routing the potential customer directly to a nearby dealer who can provide the products or services of interest to that customer. If the dealer's telephone number is busy or does not answer, the system can attempt to call another nearby dealer if one exists. The system also provides for billing the telephone call and for reporting each call in detail to the advertiser.

B1 4,757,267

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 20, 22, 30 and 37 are cancelled.

Claims 1-4, 6, 11, 12, 14, 16, 17, 21, 23, 25, 29, 31-34, and 38, 42 are determined to be patentable as amended.

Claims 5, 7-10, 13, 15, 18, 19, 24, 26-28, 35, 36, 39-41, dependent on an amended claims, are determined to be patentable.

New claims 43, 44 and 45 are added and determined to be patentable.

1. A system for routing a telephone call from a first party who dials a telephone number including digits uniquely characteristic of a given item to [a nearby] *one* second party out of a group of second parties who can supply said given item *and who is located geographically nearest to the first party*, the telephone system comprising:
   first routing means for routing said telephone call to a telephone service center relatively near said first party;
   location determining means *including information associating each second party with a geographic location* for determining the location of said [relatively nearby] *one* second party *which is located the shortest geographic distance from the location of the first party* based at least in part on the telephone number dialed by said first party; and
   second routing means for routing said telephone call from said first party through said telephone service center to said [nearby] *one* second party who can supply said item *based upon the geographic location of the second party.*

2. The system of claim 1 wherein said first routing means comprises:
   means for determining the originating telephone number of said first party[; and means for routing said telephone call to said telephone service center based upon said originating telephone number] *for use in determining the geographic location of the first party.*

3. The system of claim 2 wherein said location determining means comprises:
   a second party data base representing at least some of said group of second parties;
   comparison means for comparing at least some of the digits of said telephone number dialed by said first party against said second party data base to determine the shortest *geographic* distance between said first party and said [nearby] *one* second party.

4. The system of claim 3 wherein said second routing means comprises:
   means for automatically generating a second telephone number and dialing said second telephone number to connect said first party to said *one* second party through said telephone service center.

6. The system of claim 5 wherein said second party data base [comprises] *includes* a vertical-horizontal file.

11. A method for routing a telephone call from a first party who dials a telephone number including digits uniquely characteristic of a given item to [a nearby] *one* second party out of a group of second parties who can supply said item *and who is located geographically nearest to the first party*, said method comprising the steps of:
   (a) first routing of said call to a telephone service center;
   (b) determining the location of [a relatively nearby] *said one* second party *based upon information associating each second party with a geographic location which is located the shortest geographic distance from the location of the first party* based [upon] *at least in part on* the telephone number dialed by said first party; and
   (c) second routing of said call to said relatively nearby] *one* second party *who can supply said item based upon the geographic location of the second party.*

12. The method of claim 11 wherein step (b) further comprises the step of:
   (d) comparing at least some of the digits of the telephone number dialed by said first party against a data base representing at least some of said group of second parties to determine the shortest *geographic* distance between said first party and said [nearby] *one* second party.

14. A system for routing a telephone call from a potential customer who has an originating telephone number and who dials a telephone number including digits uniquely characteristic of a given item to [a nearby] *one* dealer out of a group of dealers who can supply said given item *and who is located geographically nearest to the potential customer*, said system comprising:
   first routing means for routing the originating telephone number of said telephone call to a telephone service center relatively near said potential customer;
   location determining means located at said telephone service center *including information associating each second party with a geographical location* for determining the location of said [nearby] *one* dealer *which is located the shortest geographic distance from the location of the potential customer* based at least in part upon the telephone number dialed by said potential customer; and
   second routing means for routing said telephone call from said potential customer to said [nearby dealer of] *one who can supply* said item *based upon the geographic location of the second party.*

16. The system of claim 15 wherein said location determining means comprises:
   a dealer data base representing at least some of said dealers; and
   comparison means for comparing at least some of the digits of said telephone number dialed by said potential customer against said dealer data base to determine the shortest *geographic* distance between said potential customer and said *one* dealer.

17. The system of claim 16 wherein said second routing means comprises:
   means for automatically generating a second telephone number and dialing the same to connect said potential customer to [a nearby] *said one* dealer through said telephone service center.

21. The system of claim [20] *1* wherein said telephone number comprises an 800 number type of telephone number and said telephone system further includes:
   a WATS to POTS conversion means for converting said 800 number to a POTS number.

23. The system of claim [22] *1* further comprising:
   billing means for producing bills based upon the number of telephone calls placed to said second parties.

25. The system of claim 24 wherein said *location determining means comprises a* second party data base [includes] *including* a vertical-horizontal file.

29. The system of claim [20] *1* wherein said *second* routing means further includes:
   means for automatically generating a second telephone number and dialing said second telephone number to connect said first party to said second party through a customer/dealer service company (CDSC).

31. The system of claim [20] *2* wherein said first party *originating* telephone number determining means comprises a human operator who solicits said first party telephone number from said first party.

32. The system of claim [20] *1* wherein said *second* routing means is connected by a network connection to the long distance carrier (LDC).

33. The system of claim 32 further including:
   further routing means for routing said telephone call to another second party if [the first] *said one* second party [called] does not answer within a predetermined period of time.

34. A system for placing an order for an item based upon a telephone call from a first party who dials a telephone number, including digits characteristic of said item to be delivered to a second party from a nearby third party out of a group of third parties who can supply said given items, said telephone system comprising:
   second party telephone number determining means for determining the telephone number of said second party;
   location determining means *including information associating each third party with a geographic location* for determining the location of said nearby third party based at least in part on the telephone number dialed by said first party; and [;]
   routing means connected to said location determining means for routing said telephone call from said first party to said third party nearby said second party who can supply said item *based upon the geographic location of the third party*.

38. A telephone system for routing a telephone call from a first party who desires an item and who dials a telephone number to [a nearby] *one* second party out of a group of second parties who can supply said item *and who is located geographical nearest to the first party*, said telephone system comprising:
   item identification means for identifying the item designated by said first party;
   first party telephone number determining means for determining the originating telephone number of said first party;
   location determining means *including information associating each second party with a geographic location* for determining the location of said [nearby] *one* second party *which is located the shortest geographic distance from the location of the first party* based at least in part on said originating telephone number of said first party and the [identify] *identity* of said item as identified by said item identification means; and,
   routing means connected to said location determining means for routing said telephone call from said first party to said [nearby] *one* second party *who can supply said item based upon the geographic location of the second party*.

42. The telephone system of claim 38 wherein said item identification means *is a* human operator.

43. A system for routing a telephone call from a first party who dials a telephone number including digits uniquely characteristic of a given item to a second party out of a group of second parties and who can supply said given item and who is located geographically nearest the first party, the telephone system comprising:
   first routing means for routing said telephone call to a telephone service center relatively near said first party;
   determining means for determining a location of the first party;
   means including information associating each second party with a geographic location for determining a second party out of said group of second parties who can supply said item and who is located geographically nearest to said first party based at least in part upon said determined location of said first party and the telephone number dialed by said first part; and
   second routing means for routing said telephone call from said first party through said telephone service center to said determined second party based upon the geographic location of the second party.

44. A system for routing a telephone call from a first party who dials a telephone number including digits uniquely characteristic of a given item to a nearby second party out of a group of second parties who can supply said given item, the telephone system comprising:
   first routing means for routing said telephone call to a telephone service center relatively near said first party;
   means for determining the originating area code (NPA) and the local central telephone office code (NNX) of said first party;
   location determining means for determining the location of said nearby second party based at least in part on the telephone number dialed by said first party and the area code and local central office code of the first party, the location determining means comprising:
   a second party database representing at least some of said group of said second parties including information associating each second party with a geographic location;
   comparing means for comparing the area code (NPA) and the local central telephone office code (NNX) of said first party against said second party database to identify the second party located the shortest geographic distance from said first party; and second routing means for routing said telephone call from said first party through said telephone service center to said identified second party who can supply said item based upon the geographic location of the second party.

45. A system for routing a telephone call from a first party who dials a telephone number including digits uniquely characteristic of a given item to a nearby second party out of a group of second parties who can supply said given item, the telephone system comprising:

first routing means for routing said telephone call to a telephone service center relatively near said first party;

determining means for determining the geographic location of the first party;

location determining means for determining the location of said relatively nearby second party based at least in part on the telephone number dialed by said first party, said location determining means including:

calculating means for calculating in real time the geographic distance between the location of the first party and a location of one or more of the second parties;

selection means for selecting, based upon said calculations, a second party which is located the shortest geographic distance from the location of the first party; and second routing means for routing said telephone call from said first party through said telephone service center to said selected second party who can supply said item.

* * * * *